United States Patent
Okada et al.

(10) Patent No.: US 9,516,699 B2
(45) Date of Patent: Dec. 6, 2016

(54) SENSOR NETWORK SYSTEM

(71) Applicants: NATIONAL INSTITUTE OF ADVANCED INDUSTRIAL SCIENCE AND TECHNOLOGY, Tokyo (JP); MICROMACHINE CENTER, Tokyo (JP)

(72) Inventors: Hironao Okada, Ibaraki (JP); Toshihiro Itoh, Ibaraki (JP); Masao Arakawa, Tokyo (JP); Toshio Sakamizu, Tokyo (JP)

(73) Assignees: NATIONAL INSTITUTE OF ADVANCED INDUSTRIAL SCIENCE AND TECHNOLOGY, Tokyo (JP); MICROMACHINE CENTER, Tokyo (JP)

(*) Notice: Subject to any disclaimer, the term of this patent is extended or adjusted under 35 U.S.C. 154(b) by 8 days.

(21) Appl. No.: 14/436,994

(22) PCT Filed: Sep. 6, 2013

(86) PCT No.: PCT/JP2013/074036
§ 371 (c)(1),
(2) Date: Apr. 20, 2015

(87) PCT Pub. No.: WO2014/061369
PCT Pub. Date: Apr. 24, 2014

(65) Prior Publication Data
US 2015/0257203 A1 Sep. 10, 2015

(30) Foreign Application Priority Data
Oct. 18, 2012 (JP) ................................ 2012-230461

(51) Int. Cl.
H04W 4/00 (2009.01)
H04W 88/18 (2009.01)
(Continued)

(52) U.S. Cl.
CPC .............. *H04W 88/18* (2013.01); *G08C 15/00* (2013.01); *G08C 15/06* (2013.01); *H04M 11/00* (2013.01);
(Continued)

(58) Field of Classification Search
CPC ..................................................... H04W 88/18
(Continued)

(56) References Cited

U.S. PATENT DOCUMENTS

2004/0249563 A1* 12/2004 Otsuki ................. G05B 19/042
701/454
2007/0280279 A1* 12/2007 Mituhasi ............. H04L 12/1895
370/428
2012/0253480 A1* 10/2012 Abe ....................... G08C 17/02
700/12

FOREIGN PATENT DOCUMENTS

JP 2000-251189 9/2000
JP 2004-24487 1/2004
(Continued)

OTHER PUBLICATIONS

Search report from PCT, Application No. PCT/JP2013/074036, mail date is Nov. 12, 2013.

*Primary Examiner* — Iqbal Zaidi
(74) *Attorney, Agent, or Firm* — Greenblum & Bernstein, P.L.C.

(57) ABSTRACT

A sensor network system is provided with a plurality of sensor terminals disposed in a predetermined area, and a monitoring center device that collects sensing data wirelessly transmitted from each of the plurality of sensor terminals. The sensor terminals wirelessly and intermittently transmit a transmission signal including sensor identification information and the latest sensing data from the sensors. The monitoring center device has the function of acquiring positional information of the sensor terminals in the prede-
(Continued)

termined area, and accumulates each item of the sensing data from the sensor terminals as time-series data in association with information about the time of acquisition. On the basis of the positional information of the sensor terminals and the time-series data of the accumulated sensing data, a time-series variation of an environmental element in the predetermined area is visually presented. The sensor network system enables monitoring of detailed environmental changes corresponding to differences in position.

13 Claims, 18 Drawing Sheets

(51) Int. Cl.
| | |
|---|---|
| *G08C 15/00* | (2006.01) |
| *G08C 15/06* | (2006.01) |
| *H04M 11/00* | (2006.01) |
| *H04Q 9/00* | (2006.01) |
| *H04W 84/18* | (2009.01) |
| *H04W 52/02* | (2009.01) |
| *H04W 64/00* | (2009.01) |

(52) U.S. Cl.
CPC ........... *H04Q 9/00* (2013.01); *H04W 52/0251* (2013.01); *H04W 84/18* (2013.01); *H04Q 2209/10* (2013.01); *H04Q 2209/40* (2013.01); *H04Q 2209/82* (2013.01); *H04Q 2209/823* (2013.01); *H04Q 2209/88* (2013.01); *H04W 64/00* (2013.01)

(58) Field of Classification Search
USPC .......................... 370/328–448; 701/12, 200
See application file for complete search history.

(56) References Cited

FOREIGN PATENT DOCUMENTS

| | | |
|---|---|---|
| JP | 2004-258855 | 9/2004 |
| JP | 2005-147722 | 6/2005 |
| JP | 2006-69414 | 3/2006 |
| JP | 2006-333358 | 12/2006 |
| JP | 2008-75973 | 4/2008 |
| JP | 2008-121911 | 5/2008 |
| JP | 2010-124163 | 6/2010 |
| JP | 2011-147279 | 7/2011 |
| JP | 2011-180946 | 9/2011 |
| JP | 2011-259252 | 12/2011 |

\* cited by examiner

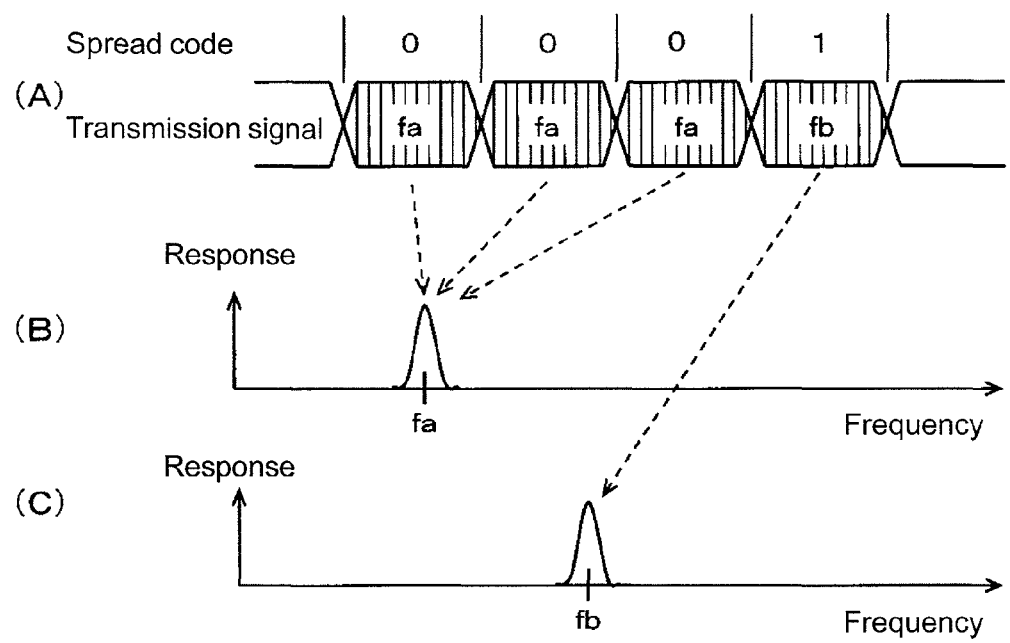

Dust concentration distribution (e.g. factory)

Airflow strength distribution (e.g. factory)

SENSOR NETWORK SYSTEM

TECHNICAL FIELD OF THE INVENTION

Our invention relates to a sensor network system in which a plurality of sensors provided in a predetermined area monitor environmental condition or the like, with sensed output of the sensors at different positions in the predetermined area.

BACKGROUND ART OF THE INVENTION

Patent document 1 (JP2011-259252-A) discloses a system in which a plurality of sensors are provided in a monitored area so that the environment is monitored to save energy in the monitored area. In patent document 1, attendance of people is determined with a plurality of sensors to achieve energy saving by performing a process such as automatic turning off air conditioners or illumination at an empty area.

PRIOR ART DOCUMENTS

Patent Documents

Patent document 1: JP2011-259252-A

SUMMARY OF THE INVENTION

Problems to be Solved by the Invention

In Patent document 1, a whole area is monitored as a region at which attendance is determined and different positions in the monitored area are not monitored in detail. Therefore, techniques disclosed in Patent document 1 could not monitor each environmental condition in a broad sales floor consisting of a plurality of sales floors such as refrigerated/frozen product floor, fresh fish/dressed meat floor, fresh vegetable floor, dry food floor and commodity floor in convenience store and supermarkets.

It could be helpful that a detailed distribution reveals dusty places and dustless places in a monitored area so that products are appropriately laid out in an appropriate sales floor, which is not achieved with a technique of Patent document 1.

Accordingly, an object of our invention is to provide a sensor network system capable of monitoring detailed environmental variation depending on different positions in a monitored area instead of a whole area to be monitored integrally.

Means for Solving the Problems

To achieve the above-described object, our invention is a sensor network system comprising: a plurality of sensor terminals which are driven with a stand-alone power supply and provided in a predetermined area in which one or more sensors are connected to each of the sensor terminals provided at a predetermined position in the predetermined area to wirelessly transmit a sensing data sensed with the sensor; and a monitoring center device collecting the sensing data wirelessly transmitted from the sensor terminals, the sensor terminal having a means for wirelessly transmitting intermittently an identification information of each sensor and a latest sensing data of each sensor, the monitoring center device comprising: a positional information acquisition means for acquiring a positional information of the sensor terminals in the predetermined area; a sensing data accumulation means for accumulating a time-series data of each sensing data sent from the sensor terminals as corresponding to an acquisition time of the sensing data; and a visualization means for presenting a visualized time-series variation of an environmental element detected by the sensor in the predetermined area by using the positional information of the sensor terminal acquired by the positional information acquisition means and the time-series data of the sensing data accumulated by the sensing data accumulation means.

In our invention, the monitoring center device acquires each position of the sensor terminals provided in the monitored area with the positional information acquisition means. Then, the sensing data accumulation means accumulates sensor outputs sent from the sensor terminals as a time-series data corresponding to its acquisition time information. And then, the visualization means of the monitoring center device uses the positional information of the sensor terminals in the monitored area and the time-series data of the sensing data accumulated by the sensing data accumulation means to present the visualized time-series variation of the environmental element, such as temperature, dust and illumination, detected by the sensor in the area.

Therefore, our invention makes it possible that environmental variation of temperature, dust or illumination depending on different positions in a predetermined monitored area is monitored with a plurality of sensor terminals provided at predetermined positions in the predetermined monitored area.

Effect According to the Invention

Our invention can provide a sensor network system capable of monitoring detailed environmental variation depending on different positions in a monitored area instead of a whole area to be monitored integrally.

BRIEF EXPLANATION OF THE DRAWINGS

FIG. 12 is an explanatory diagram of processing operation by the receiver of the relay device shown in FIG. 9.

FIG. 13 is an explanatory diagram of processing operation by a demodulation circuit of the receiver of the relay device shown in FIG. 9.

EMBODIMENTS FOR CARRYING OUT THE INVENTION

Figure 1:
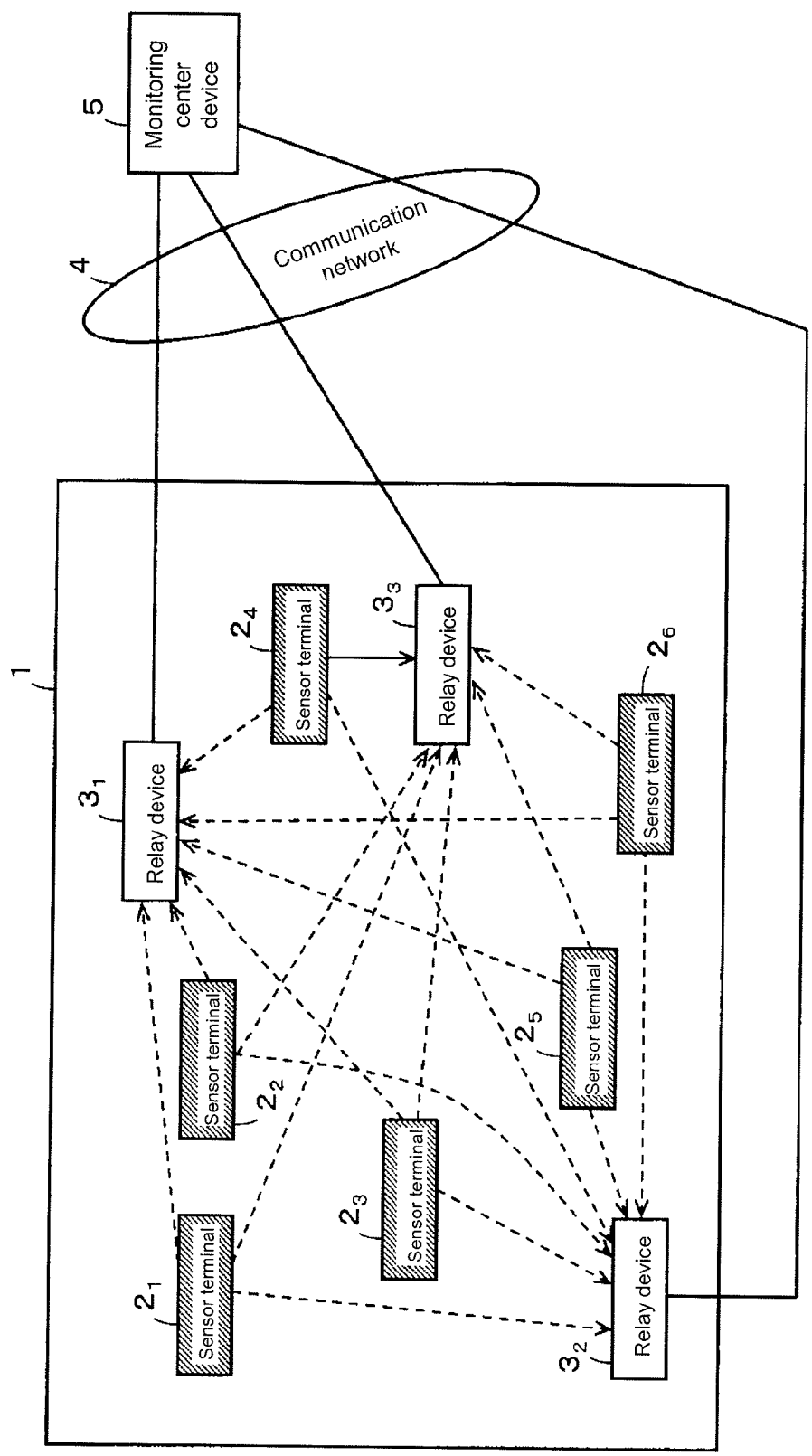
FIG. 1 is an explanatory diagram of an abstract embodiment of a sensor network system according to the present invention.

Hereinafter, examples of sensor network system according to the present invention will be explained with reference to figures. FIG. 1 is an explanatory diagram of an abstract embodiment of a sensor network system according to the present invention.

In FIG. 1, area 1 surrounded by a rectangle is an area (which may be called "monitored area" hereinafter) to be monitored in the system of this embodiment and may be a whole sales floor on the same floor of convenience stores, supermarkets or department stores. The area may be a factory or an office space. Monitored area 1 is not a flat area but a three-dimensional space area spreading in the lateral direction (X-direction), longitudinal direction (Y-direction) and height direction (Z-direction) that are orthogonal to each other. In FIG. 1, the height direction has been omitted. It is possible that monitored area 1 has any spatial shape, other than the rectangle prescribed in X-direction and Y-direction shown in FIG. 1.

In monitored area 1, a plurality of sensor terminals $2_1$-$2_n$ and a plurality of relay devices $3_1$-$3_m$, are provided. Sensor terminals $2_1$-$2_n$ may be provided at predetermined positions in monitored area 1 according to an environment monitoring plan formulated beforehand. To monitor different positions in detail of monitored area 1, many sensor terminals 2 have to be provided at different positions in monitored area 1. In this embodiment, 1,000 (n=1,000) of sensor terminals $2_1$-$2_n$, can be provided in monitored area 1. Due to limitations of space, six (n=6) of sensor terminals $2_1$-$2_6$ provided in monitored area 1 are depicted in FIG. 1.

Sensor terminals $2_1$-$2_n$, have the same configuration and are driven by a stand-alone power supply. Therefore, each of sensor terminals $2_1$-$2_n$, will be indicated simply as sensor terminal 2 when the difference is not important.

Sensor terminal 2 can be connected to sensors sensing different objects at the same time. The object to be detected by sensors is an environmental element of spatial environment in monitored area 1, such as temperature, dust, airflow, illumination and electric power consumption. Each sensor outputs sensing data of the detected object to sensor terminal 2. Sensor terminal 2 has functions to acquire sensing data of connected sensors at a predetermined timing and to wirelessly transmit the acquired sensing data together with identification data (sensor ID) indicating sensor types.

In this embodiment, relay devices $3_1$-$3_m$, are provided in monitored area 1 at different positions for receiving wireless transmission signals from sensor terminals $2_1$-$2_n$ provided in monitored area 1. In this embodiment, each of relay devices $3_1$-$3_m$, is connected to monitoring center device 5 through communication network 4. Communications network 4 may be a wired communication network such as existing phone line, or may be a wireless communication network. Communication network 4 may have a configuration of LAN (Local Area Network) or WAN (Wide Area Network).

Relay devices $3_1$-$3_m$, receive transmission signals from sensor terminals $2_1$-$2_n$, and transfer the received transmission signals to monitoring center device 5 through communication network 4 after a predetermined information to be described is added to the transmission signal. Relay devices $3_1$-$3_m$, have the same configuration, and therefore each of relay devices $3_1$-$3_m$, will be indicated simply as relay device 3 when the difference is not important.

Because each of relay devices $3_1$-$3_m$, receives transmission signals from a plurality of sensor terminals $2_1$-$2_n$, and transfers it to monitoring center device 5, transmission signals of up to the same number as relay devices $3_1$-$3_m$, are sent to monitoring center device 5 from the same sensor terminal. Relay each of devices $3_1$-$3_m$ may not receive wireless transmission signals from all sensor terminals 2 provided in monitoring area 1. As described later, it is sufficient that at least three of relay devices $3_1$-$3_m$, transfer transmission signals from the same sensor terminal 2 to monitoring center device 5.

In this embodiment, sensor terminal 2 wirelessly transmits acquired sensing data intermittently to reduce power consumption of the stand-alone power supply. In this case, it is important that relay device 3 receives sensing data from sensor terminals 2 with certainty and reliability to be transferred to monitoring center device 5.

General conventional measures thereof are such that error detection codes are added to a transmission signal sent from sensor terminals. Alternatively, sensing data may be resent when an error is detected, or transmitters and receivers may be synchronized. However, the power consumption might increase because sensor terminal 2 has to be provided with a receiving part to receive error notices from relay device 3 if the sensing data is to be resent when an error is detected. Further, the power consumption might increase because the transmission information would increase by the error correction codes to increase the transmission time if the error detection codes are to be added to the transmission signal. Furthermore, a whole configuration might become complicated with a configuration necessary for the synchronization if the transmitters and receivers are to be synchronized.

Accordingly, the wireless communication between sensor terminal 2 and relay device 3 is not synchronized, any error detection code is not added, and sensor terminals 2 don't have function to receive signals from relay devices 3, in this embodiment. Sensor terminal 2 is configured simply to have function to send sensor terminal identification data (terminal ID), sensor identification signals (sensor ID above described) and sensing data without synchronization.

On the other hand, relay device 3 always monitors transmission signals from sensor terminals 2 and acquires the transmission signals when receipt of the transmission signals of sensor terminals 2 is determined so that transmission signals sent from sensor terminals without synchronization are transferred to monitoring center device 5.

However, the communication between sensor terminal 2 and relay device 3 is asynchronous and sensor terminals 2 as many as 1,000 can be provided in monitored area 1, and therefore it should be considered that the starting timings of intermittent transmission from many sensor terminals 2 might be coincident to make the transmission signals interfere to each other. With such an interference between the transmission signals, sensing data of sensor terminals 2 could not be received to deteriorate reliability of monitoring result by monitoring center device 5.

Accordingly, each sensor terminal 2 has a randomizer to generate random values to determine the starting timing of the intermittent transmission so that the starting timings of the intermittent transmission are not coincident in this embodiment.

To improve reliability to surely receive transmission signals from sensor terminal 2 by relay device 3, sensor terminals 2 send the same information as transmission signals having different frequency bands several times by time division in this embodiment. Specifically for the intermittent transmission timing, sensor terminal 2 sends out transmission information in 315 MHz band and then sends out the same transmission information in 920 MHz band again, in this embodiment as described later in detail.

This embodiment has been further improved to suppress power consumption of stand-alone power supply of sensor terminal 2 as much as possible.

As described later, since monitoring center device 5 is required to control sensing data from sensor terminal 2 as time-series data being stored corresponding to the acquisition time (occurrence time), sensing data from sensor terminal 2 should include information of the acquisition time. Ordinarily, the transmission signal including information at the acquisition time when sensor terminal 2 stored data from sensors is transferred through relay device 3 and communication network 4 to monitoring center device 5. However, as much information is transmitted from sensor terminal 2 the more electric power is consumed.

Accordingly, sensor terminal 2 transmits sensing data without including the information at the acquisition time to relay device 3 in this embodiment. Then the receiving time of transmission signals of sensor terminal 2 by relay device 3 is regarded as an acquisition time of sensing data included in transmission signals from sensor terminal 2. The information at the receiving time is transferred to monitoring center device 5 together with the sensing data.

The acquisition time of sensing data employed by the monitoring center device may be such time that the device receives transmission signals from sensor terminals.

As described later, monitoring center device 5 is informed of positions at which sensor terminals $2_1$-$2_n$, are provided in monitored area 1, so that environmental condition at different positions in monitored area 1 is determined in detail to visualize the environmental condition. That requires positional information of sensor terminals $2_1$-$2_n$, in monitored area 1. However, if the positional information of sensor terminals $2_1$-$2_n$, is included in the transmission signal, the power consumption increases as information transmitted from sensor terminals $2_1$-$2_n$, increases.

Accordingly, transmission signals of sensor terminals $2_1$-$2_n$, do not include the provision positional information in monitored area 1 in this embodiment. On the other hand, relay device 3 adds information for calculating positions to provide sensor terminals $2_1$-$2_n$, in monitored area 1 by monitoring center device 5.

In this example, since each of relay devices $3_1$-$3_m$, is provided at positions different to each other, the relay devices have different distances from sensor terminals $2_1$-$2_n$. The radio field intensity of transmission signals received from sensor terminals $2_1$-$2_n$, by relay devices $3_1$-$3_m$, corresponds to the distance between each of relay devices $3_1$-$3_m$, and each of sensor terminals $2_1$-$2_n$.

In this embodiment, relay device 3 detects the radio field intensity when it receives a transmission signal from sensor terminals $2_1$-$2_n$. Then relay device 3 adds information of the radio field intensity to received signals sent from sensor terminals $2_1$-$2_n$, and transfers it to monitoring center device 5.

In this embodiment, monitoring center device 5 uses information of the radio field intensity as information for calculating positions to provide sensor terminals $2_1$-$2_n$, in monitored area 1. In other words, monitoring center device 5 calculates the distance between each of relay devices $3_1$-$3_m$, and each of sensor terminals $2_1$-$2_n$, with radio field intensity information sent from relay devices $3_1$-$3_m$. Positions at which relay devices $3_1$-$3_m$, are provided in monitored area 1 are registered in monitoring center device 5, so that monitoring center device 5 detects positions of sensor terminals $2_1$-$2_n$, in monitored area 1, from the positional information of relay devices $3_1$-$3_m$, as well as the distance between each of relay devices $3_1$-$3_m$, and each of sensor terminals $2_1$-$2_n$.

To detect positions (including height) of sensor terminals $2_1$-$2_n$, in monitored area 1 by monitoring center device 5, at least three of relay devices $3_1$-$3_m$, have to be provided in monitored area 1. In FIG. 1, only three relay devices $3_1$-$3_3$ are provided in monitored area 1 for convenience of explanation.

Thus sensor terminal 2 minimizes transmission amount of data sent out as much as possible to achieve low power consumption of the stand-alone power supply in this embodiment.

Monitoring center device 5 thus receives and collects sensing data sent from each sensor terminals $2_1$-$2_n$, through relay devices $3_1$-$3_m$. As described above, the same information of the same sensor terminal 2 is sent from a plurality of relay devices 3 to monitoring center device 5. When monitoring center 5 receives a plurality of transmission signals of the same information of the same sensor terminal 2, it selects sensing data of the strongest radio field intensity to be accumulated with reference to radio field intensity information. Monitoring center device 5 accumulates time-series data of sensing data corresponding to information at such acquisition time that the information is added and received by relay devices $3_1$-$3_m$.

Although the sensing data accumulated by monitoring center device 5 may be selected corresponding to the radio field intensity, any of transmission signals having the same information can arbitrarily be selected and accumulated.

As described above, monitoring center device 5 extracts each radio field intensity of transmission signal of the same information content of the same sensor terminal 2 sent from relay devices $3_1$-$3_m$, and calculates and holds a position of each sensor terminal 2 in monitored area 1 with the extracted radio field intensity and the preliminarily stored positional information of relay devices $3_1$-$3_m$, in monitored area 1.

From the accumulated time-series sensing data of each sensor acquired from sensor terminals $2_1$-$2_n$, and the positional information of sensor terminals $2_1$-$2_n$, in monitored area 1, environmental information determined with the sensing data is converted to visualized display information and displayed on the display screen.

An operator of monitoring center device 5 can comprehend the time-series variation of environmental information acquired from the sensing data in monitored area 1 by seeing the visualized information on the display screen. With such a comprehension result, the operator can appropriately give instructions based on a decision made according to environmental changes in monitored area 1.

Next, details of configuration and processing of sensor terminal 2, relay device 3 and monitoring center device 5 in the system will be explained further.

[Explanation of Sensor Terminal 2]

Figure 2:
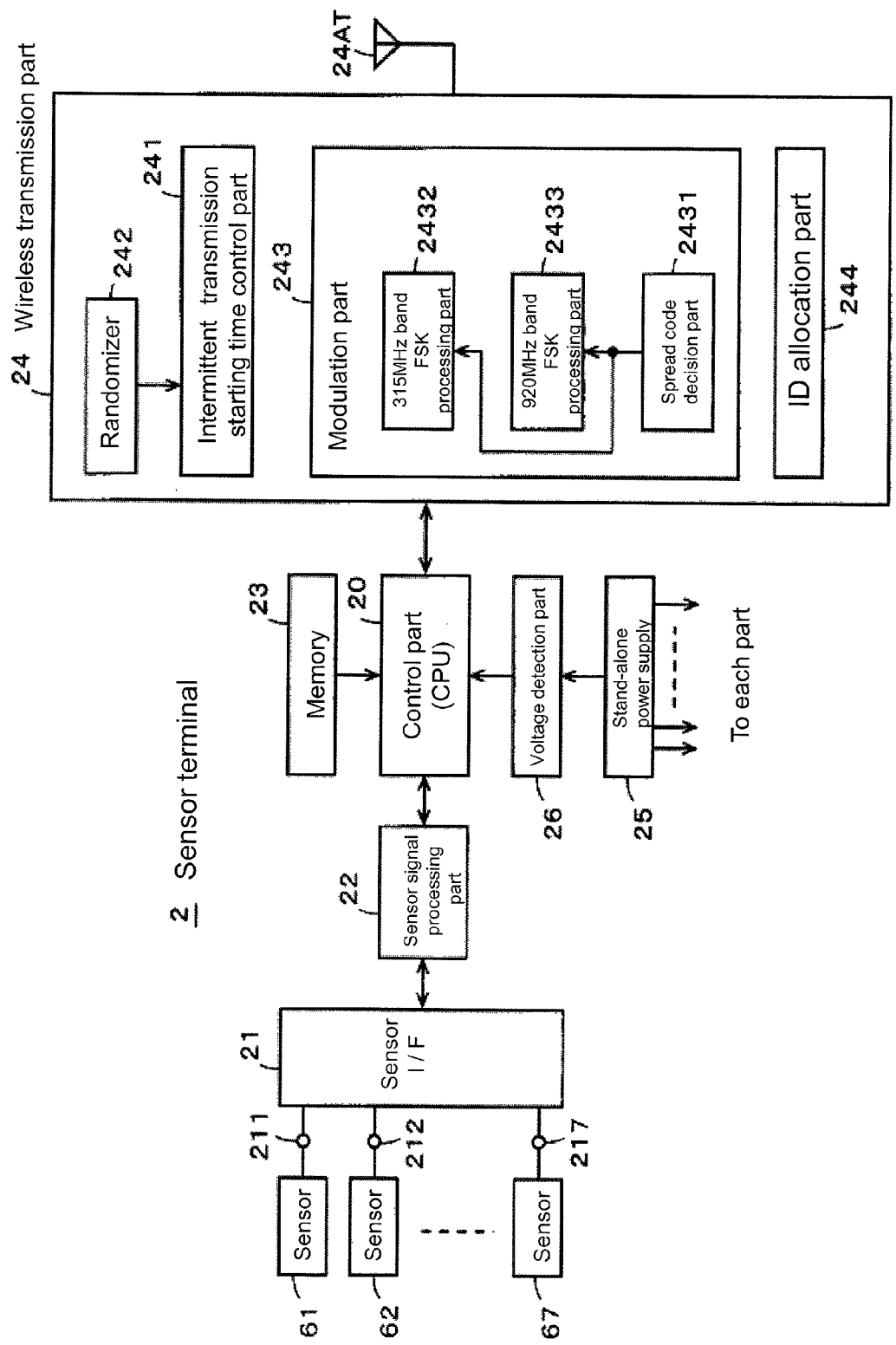
FIG. 2 is a block diagram showing a configuration example of sensor terminal constituting a sensor network system according to an embodiment of the present invention.

FIG. 2 is a block diagram showing a hardware configuration example of sensor terminal 2. As shown in FIG. 2, sensor terminal 2 has control part 20 which controls a whole sensor terminal 2 and comprises a microcomputer, sensor interface 21, sensor signal processing part 22, memory 23, wireless transmission part 24, stand-alone power supply 25 and voltage detection part 26.

Sensor interface 21 is provided with seven sensor connection terminals 211, 212, . . . , 217 in this example. Predetermined seven types of sensors 61, 62, . . . , 67 can be connected to each of seven sensor connection terminals 211-217. For example, sensor 61 may be an infrared array sensor (temperature sensor), sensor 62 may be a dust sensor, sensor 63 may be a carbon dioxide concentration sensor, sensor 64 may be a VOC (Volatile Organic Compounds) concentration sensor, sensor 65 may be an electric current/ magnetic field sensor, . . . , or the like. In this embodiment, sensors 61-67 are compactly configured by techniques of MEMS (Micro Electro Mechanical System). All of sensor connection terminals 211-217 don't have to be connected with sensors, and can be connected with only a sensor having a sensor type selected corresponding to an environmental factor that should be monitored.

Sensor interface 21 is connected to control part 20 through sensor signal processing part 22. Sensor signal processing part 22 is controlled by control part 20 to be provided with sensing data of sensors connected to sensor connection terminals 211-217 acquired from sensor interface 21.

Control part 20 acquires sensing data of each sensor at each appropriate timing according to sensor type, and then controls the acquired sensing data to be intermittently sent by a predetermined cycle according to sensor type. In this embodiment, control part 20 controls the start and stop of external sensors as well as the acquisition of sensing data as controlling the start and stop of wireless transmission of sensing data by intermittent cycle corresponding to sensor type as well as temporary recording/storing.

It is possible for each sensor that the intermittent timing of wireless transmission of sensing data is synchronized with the sensing data acquisition timing. However in this embodiment, the timings are not synchronized while its repetitive cycles can be individually designed.

In this embodiment, control part 20 acquires and monitors sensing data of each sensor by a cycle corresponding to sensor type until a predetermined event occurrence condition of each sensor type is met. For example, when an event occurrence condition of "rapid change of temperature" is met by sensing data of infrared array sensor 61, control part 20 immediately transmits sensing data of infrared array sensor 61 wirelessly even if it is not at intermittent transmission timing, and then shortens the intermittent cycle of intermittent wireless transmission in the future.

Further, when sensing data of a sensor meets its event occurrence condition, sensing data of the sensor is immediately transmitted wirelessly as changing the cycle of the intermittent wireless transmission while sensing data of another sensor related thereto is processed similarly. For example, when sensing data of carbon dioxide sensor 63 meets the event occurrence condition that "carbon dioxide density exceeds a predetermined value", sensing data is immediately transmitted wirelessly acquired from infrared array sensor 61 and VOC concentration sensor 64 as well as carbon dioxide sensor 63 to shorten the intermittent cycle of the intermittent wireless transmission afterwards.

For performing such a timing control, control part 20 sends an instruction to sensor signal processing part 22 to acquire sensing data of the connected sensor to each of sensor connection terminals 211-217 of sensor interface 21. The control part receives the acquired sensing data to be temporarily stored and held in memory 23. Then, the sensing data stored in memory 23 is used to monitor sensors of each sensor type until it corresponds to a predetermined event occurrence condition.

Control part 20 controls intermittent wireless transmission timing of each sensor type and reads out the latest sensing data of a sensor from memory 23 at the starting time of intermittent wireless transmission of the sensor and sends the sensing data to wireless transmission part 24 together with an instruction of the intermittent wireless transmission. At this time, even sensor type information is sent to wireless transmission part 24 from control part 20.

Wireless transmission part 24 is provided with intermittent transmission starting time control part 241, randomizer 242, modulation part 243 and ID allocation part 244.

Intermittent transmission starting time control part 241 receives an instruction to start intermittent transmission from control part 20 and determines the transmission starting time according to the random value of randomizer 242. The cycle of intermittent transmission of a sensor depends to the sensor type in control part 20 while the transmission signals are sent out arbitrarily from sensor terminals 2, therefore the intermittent transmission timings of sensors of the same sensor type might be coincident for different sensor terminals in this embodiment. In such a case relay device 3 can hardly separate the information signal received as conflicting. Accordingly, random values generated by randomizer 242 are employed to prevent the conflict between sensor transmission timings of sensor terminals 2 as far as possible.

Figure 3:
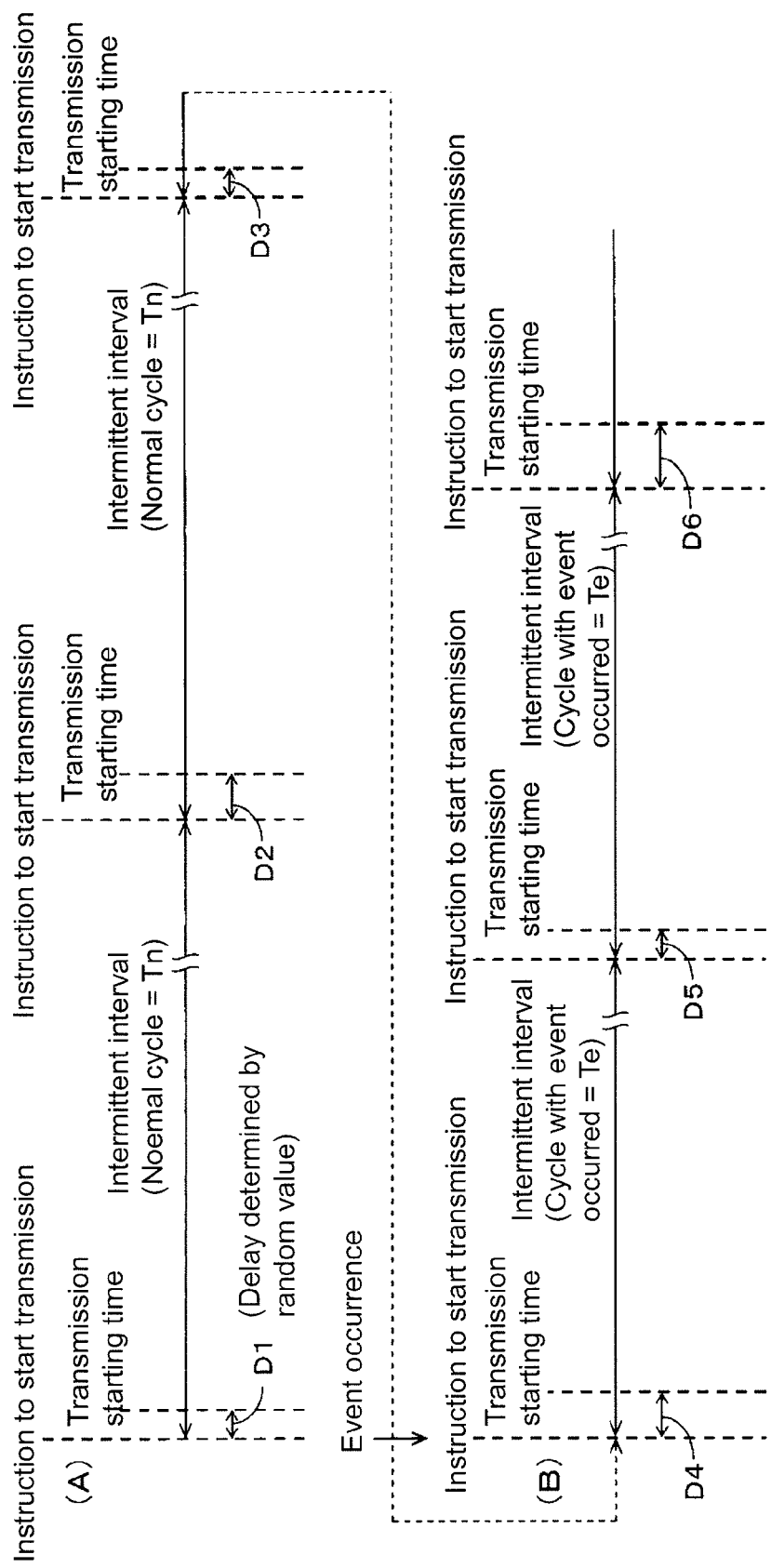
FIG. 3 is an explanatory diagram of wireless transmission timing of the sensor terminal shown in FIG. 2.

FIG. 3 is an explanatory diagram of control of cycle and starting time of intermittent transmission of a type of sensor. FIG. 3 (A) shows that the intermittent cycle of wireless transmission in a normal condition of the sensor is indicated as Tn, and control part 20 sends an instruction to start transmission to wireless transmission part 24. Intermittent cycle Tn is supposed to be several minutes to ten minutes for infrared array sensor 61.

Receiving the instruction to start transmission, wireless transmission part 24 refers to a random value of randomizer 242 to determine delay times D1, D2, D3 . . . from receiving times of the instruction to start transmission according to the random value, and timings delayed by delay times D1, D2, D3 . . . are set as actual starting times of wireless transmission. Each of delay times D1, D2, D3 . . . is set as zero or an integral multiple of time length TX of transmission interval before completing wireless transmission to be described. Time length TX of the transmission interval is set as 2 msec in this example as described later.

Detecting an event occurrence related to this sensor type, control part 20 sends an instruction to start transmission to wireless transmission part 24 at the event occurrence time as shown in FIG. 3 (B). After that, control part 20 changes the intermittent cycle into cycle Te shorter than normal cycle Tn and sends the instruction to start transmission to wireless transmission part 24 as shown in FIG. 3.

Thus wireless transmission part 24 sends out a transmission signal just after the event occurrence. After the event occurrence, wireless transmission part 24 performs wireless transmission while intermittent transmission starting time control part 241 determines delay times D4, D5, D6 . . . with reference to a random value of randomizer 242 at each receiving time of the instruction to start transmission by shorter cycle Te from control part 20. Even an intermittent transmission of sensing data of another sensor type is subject to a similar timing control although the intermittent cycle may vary.

Besides, control part 20 recovers the timing of instruction to start transmission to normal intermittent cycle Tn if the event occurrence condition is not detected any more.

Thus in this embodiment, although sensor terminal 2 has a predetermined intermittent cycle for each sensor type, the cycle is not constant because an actual intermittent transmission timing is set at the time delayed by integral multiples of transmission interval time length based on a random value. Therefore, even if another sensor terminal 2 happened to have the same instruction timing to start intermittent transmission determined by control part 20, actual wireless transmission is not likely to have a conflict.

In this embodiment, once an event corresponding to a sensor type occurs, sensing data of a sensor corresponding thereto is sent out at the event occurrence time while the intermittent transmission cycle is shortened than a normal cycle when the event occurrence condition is met. Therefore, monitoring center device 5 can monitor a condition in more detail after the event occurs.

Using an FSK (Frequency Shift Keying) modulating frequency in this embodiment, modulation part 243 of wireless transmission part 24 employs a new modulation method made by combining a multilevel FSK using 100 or more of frequencies with a CCK (Complementary Code Keying). In this embodiment, sensor terminal 2 employs wireless transmission meeting the low-power radio standard as using frequency bands of 315 MHz and 920 MHz.

To achieve the new modulation method combining the above-described multilevel FSK and CCK in this embodiment, modulation part 243 is provided with spread code decision part 2431, 315 MHz band FSK processing part 2432 and 920 MHz band FSK processing part 2433.

Figure 4:
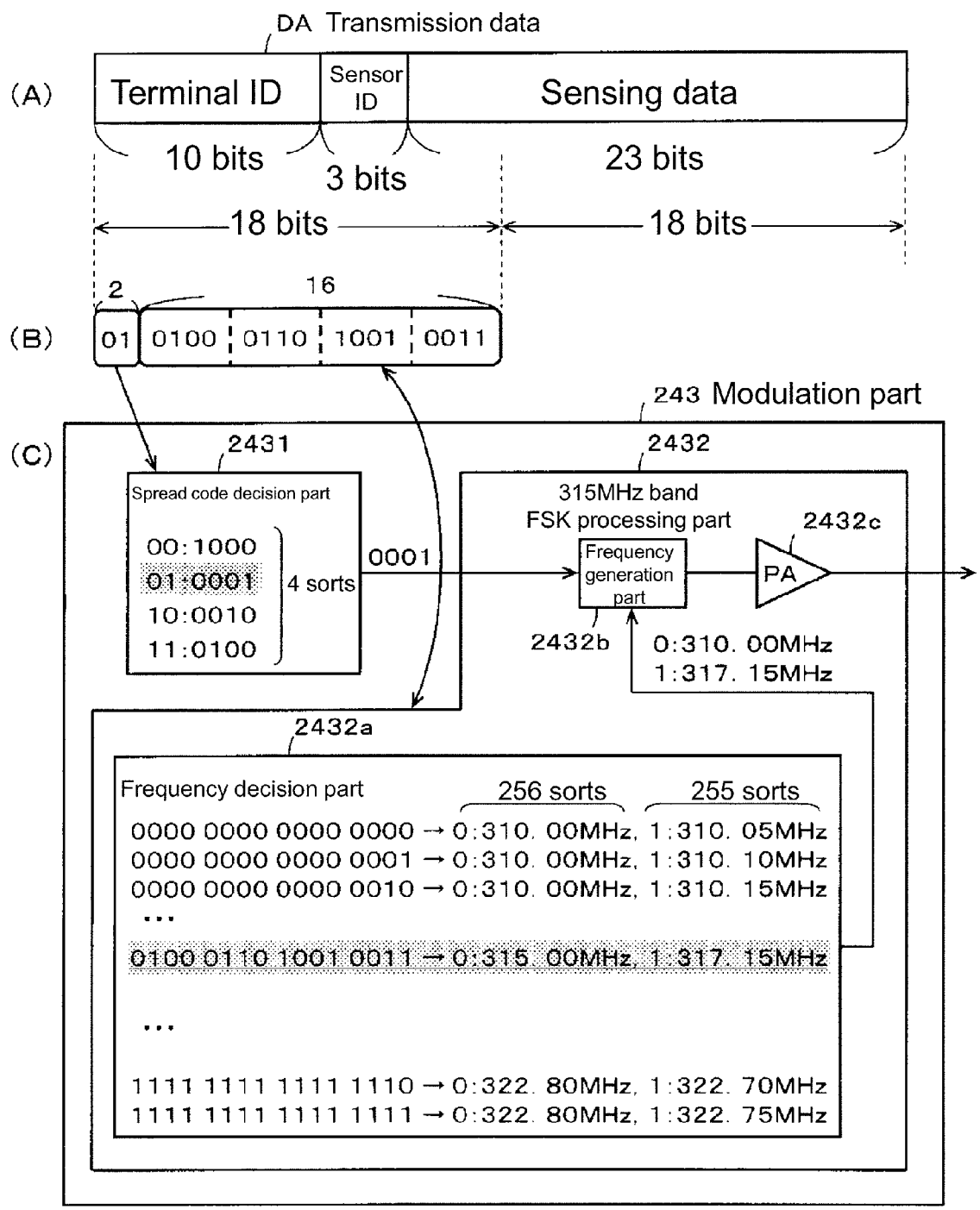
FIG. 4 is a explanatory diagram of modulation method of wireless transmission signal of the sensor terminal shown in FIG. 2.

To prevent the intermittent wireless transmission radiowave from conflicting to a plurality of sensor terminals 2 in this embodiment, time lengths of intermittent wireless transmission interval are shorten as much as possible by decreasing transmission data of sensor terminal 2. Therefore as shown in FIG. 4 (A), transmission data DA that is wirelessly transmitted from sensor terminal 2 consists of minimum data including terminal ID, sensor ID and sensing data, without data for synchronization and parity data for error detection or error correction.

In this example, terminal ID consists of 10-bit data since the number of sensor terminals 2 is assumed as 1,000. Since the number of sensor types is assumed as 7, sensor ID consists of 3-bit data while sensing data consists of 23-bit data. Therefore transmission data DA consists of 36-bit data in total. Because sensor ID consists of 3-bit data, there is one spare sensor ID left. As described later in this embodiment, the spare sensor ID is used for transmitting to monitoring center device 5 an electric charge amount (power supply condition) of stand-alone power supply 25 of sensor terminal 2.

ID allocation part 244 stores the terminal ID of its own sensor terminal and sensor IDs corresponding to sensor types. Based on sensor type information sent from control part 20 together with an instruction to start intermittent transmission, ID allocation part 244 reads out and sends the terminal ID of its own sensor terminal and sensor ID corresponding to the sensor type to modulation part 243. Modulation part 243 generates transmission data DA by combining sensing data sent from control part 20, terminal ID provided by ID allocation part 244 and sensor ID. Thus generated transmission data DA is subject to the following modulation processing.

[Modulation Processing by Modulation Part 243]

The modulation processing by modulation part 243 will be explained with reference to FIG. 2, FIGS. 4 (B) and (C). In this embodiment, 36-bit transmission data DA is divided into two 18-bit data. The 18-bit data is subject to a modulation processing as a combination of multilevel FSK and CCK as described below.

As shown in FIGS. 4 (B) and (C), spread code decision part 2431 of modulation part 243 decides a 4-chip spread code corresponding to 2-bit code pattern of top 2 bits in 18-bit data.

Spread code decision part 2431 decides and stores a 4-chip spread code string pattern corresponding to each of four code string patterns [00], [01], [10], [11] of 2-bit data. As shown in FIG. 4 (C), the four code string patterns [00], [01], [10], [11] of 2-bit data and 4-chip spread code string patterns [1000], [0001], [0010], [0100] are stored as respectively corresponding to each other in this example. Spread code decision part 2431 decides a 4-chip code string pattern corresponding to top 2-bit data as a spread code. From the 18-bit data [010100011010010011] as shown in FIG. 4 (B), spread code decision part 2431 decides 4-chip code string pattern [0001] corresponding to top 2-bit data [01] as a spread code.

Then, 315 MHz band FSK processing part 2432 of modulation part 243 decides a frequency allocated to code value "0" of spread code chip decided by spread code decision part 2431 and another frequency allocated to code value "1" of the chip. Thus decided frequencies are output as corresponding to 4-chip code string patterns decided by spread code decision part 2431.

As shown in FIG. 4 (C) in this embodiment, 315 MHz band FSK processing part 2432 is provided with frequency decision part 2432*a*, frequency generation part 2432*b* and output amplifier 2432*c*.

From the 16-bit data except the top 2 bits of the 18-bit data, frequency decision part 2432*a* decides a frequency allocated to code value "0" of spread code chip decided by spread code decision part 2431 and another frequency allocated to code value "1" of the chip. In this embodiment, frequency decision part 2432*a* decides the frequency allocated to code value "0" of spread code chip according to 256 code string patterns of the anterior 8 bits in the 16-bit data except the top 2 bits of the 18-bit data and decides another frequency allocated to code value "1" of the spread chip according to the code patterns of the posterior 8 bits.

In this embodiment, frequency decision part 2432*a* assumes 256 different frequencies as transmission frequencies between 310.0 MHz and 322.80 MHz at 0.05 MHz intervals. As shown in FIG. 4 (C), frequency decision part 2432a stores a correspondence table between each 16-bit data code string pattern and a pair of frequency allocated to chip code value "0" of spread code determined by the anterior 8-bit code string pattern of the data code string pattern and frequency allocated to chip code "1" of spread code determined by the posterior 8-bit code string pattern. The frequency allocating chip code value "0" of the spread code is set as different from the other frequency allocating chip code "1" of the spread code, and therefore as shown in FIG. 4 (C), the other frequency allocating chip code "1" of the spread code to be combined with the code value "0" of the frequency is selected among 255 values once the frequency allocating chip code value "0" of the spread code is decided.

For example, as shown with frequency decision part 2432a in FIG. 4 (C), frequency of 310.0 MHz is allocated to the anterior 8-bit [00000000] in 16-bit code string pattern to which chip code value "0" of the spread code is allocated. Therefore, the frequency to which chip code value "1" is allocated as a counterpart of chip code value "0" is selected from 255 frequencies set between 310.05 MHz and 322.80 MHz by 0.05 MHz intervals except for 310.00 MHz.

Frequency decision part 2432a refers to the correspondence table to decide a frequency allocated to chip code value "0" of the spread code corresponding to 16-bit data except the top 2 bits and another frequency allocated to code value "1". As shown in FIG. 4 (B), from the code string pattern of which transmission data has 16-bit data [0100011010010011] except the top 2 bits, frequency decision part 2432a decides frequency f [0] corresponding to chip value "0" of the spread code to satisfy f [0]=315.00 MHz as deciding frequency f [1] corresponding to chip value "1" of the spread code to satisfy f [1]=317.05 MHz.

The information of frequency f [0] and frequency f [1] decided by frequency decision part 2432a and is provided in frequency generation part 2432b. Even a four code string pattern of the spread code decided by spread code decision part 2431 is provided in frequency decision part 2432b.

For example, frequency generation part 2432b is provided with a variable frequency oscillator comprising PLL (Phase Rock Loop), and outputs the frequency decided by frequency decision part 2432a corresponding to code values "0" and "1" of the 4-chip code string pattern of the spread code of spread code decision part 2432a. Then the frequency signal output from frequency generation part 2432b is provided to transmitting antenna AT through output amplifier 2432c, and is wirelessly transmitted.

Even the posterior 18-bit data of 36-bit transmission data DA is subject to the same processing with spread code decision part 2431 and 315 MHz band FSK processing part 2432 of modulation part 243, and is converted to have a frequency corresponding to the 18-bit data to be wirelessly transmitted through output amplifier 2432c to transmission antenna AT.

Although the top 2 bits of transmission data is allocated to the spread code in the above-described example, the 2 bits may be selected from any digits of the transmission data other than the top. Although the transmission data consisting of 18 bits is explained in the above-described example, the transmission data may consist of any bit number without such a limitation.

The spread code may be allocated to not only 2 bits but also 3 or more bits of transmission data.

For multilevel FSK in the above-described example, the anterior 8 bits and posterior 8 bits in 16-bit data are respectively allocated to chip code "0" and "1" of the spread code, so that 256 frequencies are allocated to the 16-bit data. However, the number of the data bits to allocate a plurality of multilevel FSK frequencies is arbitrary and the number of frequencies employed in the multilevel FSK is decided according to the number of data bits to allocate.

920 MHz band FSK processing part 2433 has a configuration similar to that of 315 MHz band FSK processing part 2432. However, the number of frequencies used for multilevel FSK should be minimized because 920 MHz band FSK processing part 2433 has a low upper limit of electric field intensity to be output in 920 MHz band so that the number of frequency channels simultaneously available is limited.

Accordingly in the modulation method made by combining multilevel FSK and CCK of 920 MHz band FSK processing part 2433, the number of bits allocated to CCK in transmission data may be maximized, so that the number of bits allocated to multilevel FSK is minimized to minimize the number of frequencies used in multilevel FSK.

Alternatively, the transmission data may be divided into more than two of the above-described example to be transmitted for each bit number corresponding to frequency available in the multilevel FSK while the bit number allocated to CCK is not changed in the modulation method made by combining multilevel FSK and CCK of 920 MHz band FSK processing part 2433. In this example, it is preferable that the transmission bit rate is increased to prevent the transmission interval from elongating.

920 MHz band FSK processing part 2433 processes transmission data DA of 36 bits same as the one processed in 315 MHz band FSK processing part 2432 as described above to be converted into a signal of a frequency in 920 MHz band and provided to transmission antenna AT for wireless transmission.

Figure 5:
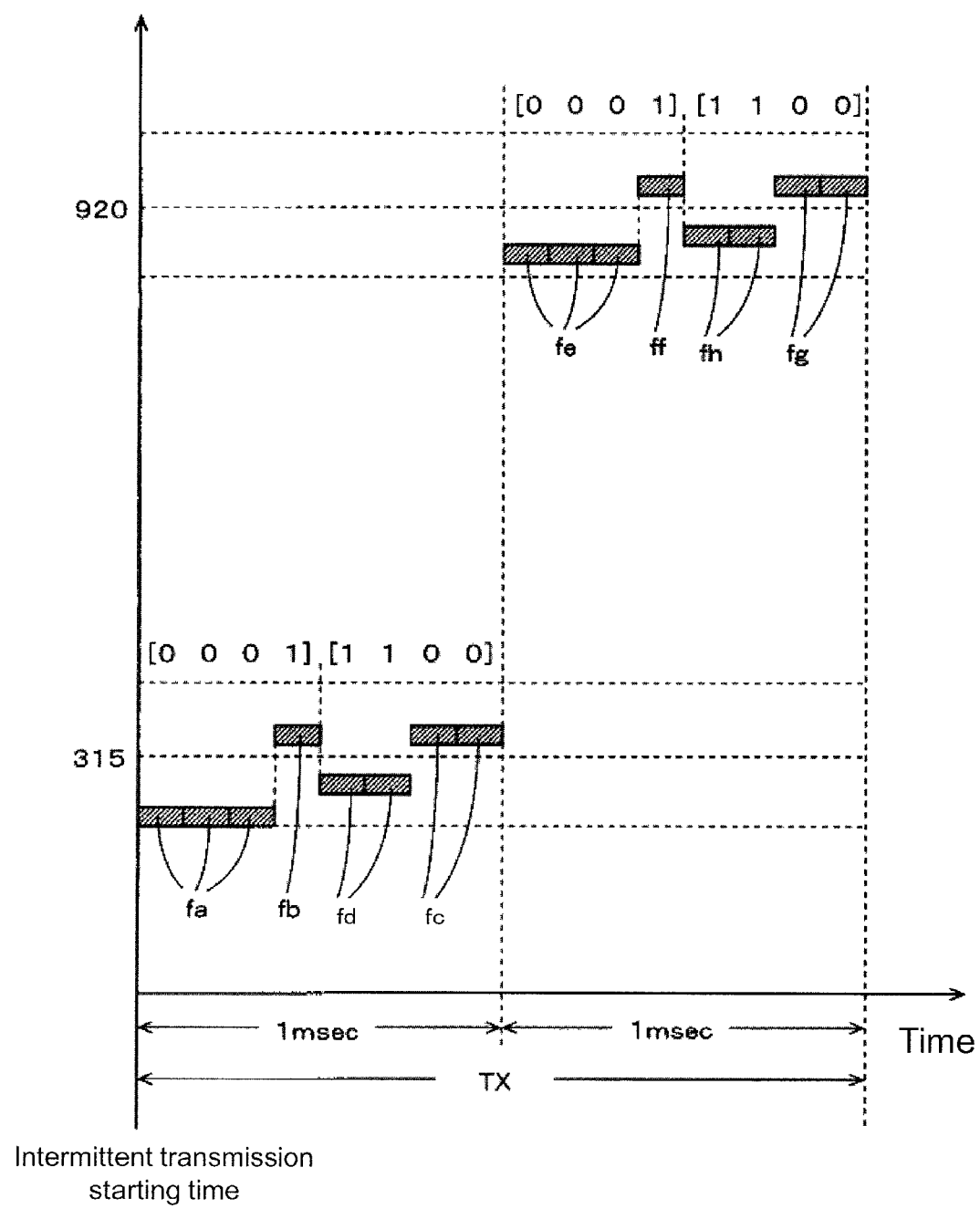
FIG. 5 is an explanatory diagram of modulation method and transmission method of wireless transmission signal of the sensor terminal shown in FIG. 2.

In this embodiment, sensor terminal 2 transmits transmission data DA in transmission interval TX from the intermittent transmission starting time to 2 msec later thereof with 315 MHz band and 920 MHz band as shown in FIG. 5. Namely in this embodiment, wireless transmission part 24 sends out a frequency signal as wireless transmission signal acquired from transmission data DA by the modulation method combining the multilevel FSK and CCK with 315 MHz band FSK processing part 2432 of modulation part 243 during 1 msec in the first half of transmission interval TX from the intermittent transmission starting time.

After the 1 msec passes by, wireless transmission part 24 sends out frequency signal as wireless transmission signal acquired from the same transmission data DA by the modulation method combining the multilevel FSK and CCK with 920 MHz band FSK processing part 2433 of modulation part 243.

In this example, the frequency signal transmitted wirelessly from sensor terminal 2 is always a sole frequency signal in 315 MHz band and 920 MHz band as shown in FIG. 5. FIG. 5 shows a frequency change of wireless transmission signal having 4-chip spread code [0001] decided from the top 2 bits of the anterior 18 bits of 36-bit transmission data DA and 4-chip spread code [1100] decided from the top 2 bits of posterior 18 bits.

From 16 bits except the top 2 bits of anterior 18 bits of transmission data DA, 315 MHz band FSK processing part 2432 of modulation part 243 decides frequency fa as a frequency allocated to chip code value "0" of the spread code and frequency fb (fa≠gb) as a frequency corresponding to code value "1". As shown in FIG. 5, 315 MHz band FSK processing part 2432 of modulation part 243 sends out frequency fa-frequency fa-frequency fa-frequency fb as wireless transmission signal, corresponding to 4-chip spread code [0001] decided from the top 2 bits of anterior 18 bits of transmission data DA.

Next, from 16 bits except the top 2 bits of posterior 18 bits of transmission data DA, 315 MHz band FSK processing part 2432 of modulation part 243 decides frequency fc as a frequency allocated to chip code value "0" of the spread code and frequency fd (fc≠gd) as a frequency corresponding to code value "1". In this case, fc=fa and fd=fb are to be satisfied if 16 bits except the top 2 bits of anterior 18 bits of transmission data DA is the same as 16 bits except the top 2 bits of posterior 18 bits of transmission data DA. Unless that, fc≠fa and fd≠gb are to be satisfied.

As shown in FIG. 5, 315 MHz band FSK processing part 2432 of modulation part 243 sends out frequency fd-frequency fd-frequency fc-frequency fc as wireless transmission signal, corresponding to 4-chip spread code [1100] decided from the top 2 bits of posterior 18 bits of transmission data DA.

Next, from 16 bits except the top 2 bits of anterior 18 bits of transmission data DA, 920 MHz band FSK processing part 2433 of modulation part 243 decides frequency fe as a frequency allocated to chip code value "0" of the spread code and frequency ff (fe≠ff) as a frequency corresponding to code value "1", because the same 36-bit transmission data DA is wirelessly transmitted. As shown in FIG. 5, 920 MHz band FSK processing part 2433 of modulation part 243 sends out frequency fe-frequency fe-frequency fe-frequency ff as wireless transmission signal corresponding to 4-chip spread code [0001] decided from the top 2 bits of anterior 18 bits of transmission data DA.

Next, from 16 bits except the top 2 bits of posterior 18 bits of transmission data DA, 920 MHz band FSK processing part 2433 of modulation part 243 decides frequency fg as a frequency allocated to chip code value "0" of the spread code and frequency fh (fg≠fh) as a frequency corresponding to code value "1". As shown in FIG. 5, 920 MHz band FSK processing part 2433 of modulation part 243 sends out frequency fh-frequency fh-frequency fg-frequency fg as wireless transmission signal, corresponding to 4-chip spread code [1100] decided from the top 2 bits of posterior 18 bits of transmission data DA.

As explained above, frequency of wireless transmission signal sent out from modulation part 243 changes depending on data contents of transmission data DA. Even if the intermittent transmission starting time conflicts with another sensor terminal 2, transmission signals of sensor terminals 2 conflicting with each other can be received separately at the receiving side since the frequencies of wireless transmission signal are different unless the data contents of transmission data DA are the same. In this embodiment, random values from randomizer 242 are used to make the intermittent transmission starting times from sensor terminals 2 different as much as possible. Further, the wireless transmission signal frequency is differently determined according to data contents of transmission data DA, so that the possibility to fail to receive transmission signal from sensor terminal 2 at the receiving side is decreased further.

In this embodiment, since the same transmission data is sent out with different frequency bands such as 315 MHz band and 920 MHz band, there is a chance to receive the transmission signal with one frequency band even if the transmission signal cannot be received with the other frequency band. The possibility to fail to receive transmission signal from sensor terminal 2 can also be decreased further from this viewpoint.

The above-described modulation method combining multilevel FSK and CCK can achieve a low electric power consumption, specifically in a long-distance communication for wireless transmission which consumes much electric power.

Since this modulation method employs frequency as a modulation parameter which can easily be determined even with weak radiowave, a receiving sensitivity can be increased. Although the occupied channel frequency width might be excessive, this embodiment provides a sensor network system performing wireless transmission with frequency of less than 322 MHz according to the weak radiowave standard. This system employs wireless sensor terminals which send little transmission data to finish communications within several msec, so that the conflict between wireless sensor terminals using the same band is unlikely. Further, the weak radiowave standard only prescribes radio field intensity without occupied band limitation, so that the violation of Radio Act is unlikely.

[Explanation of Processing Operation with Sensor Terminal 2]

Figure 6:
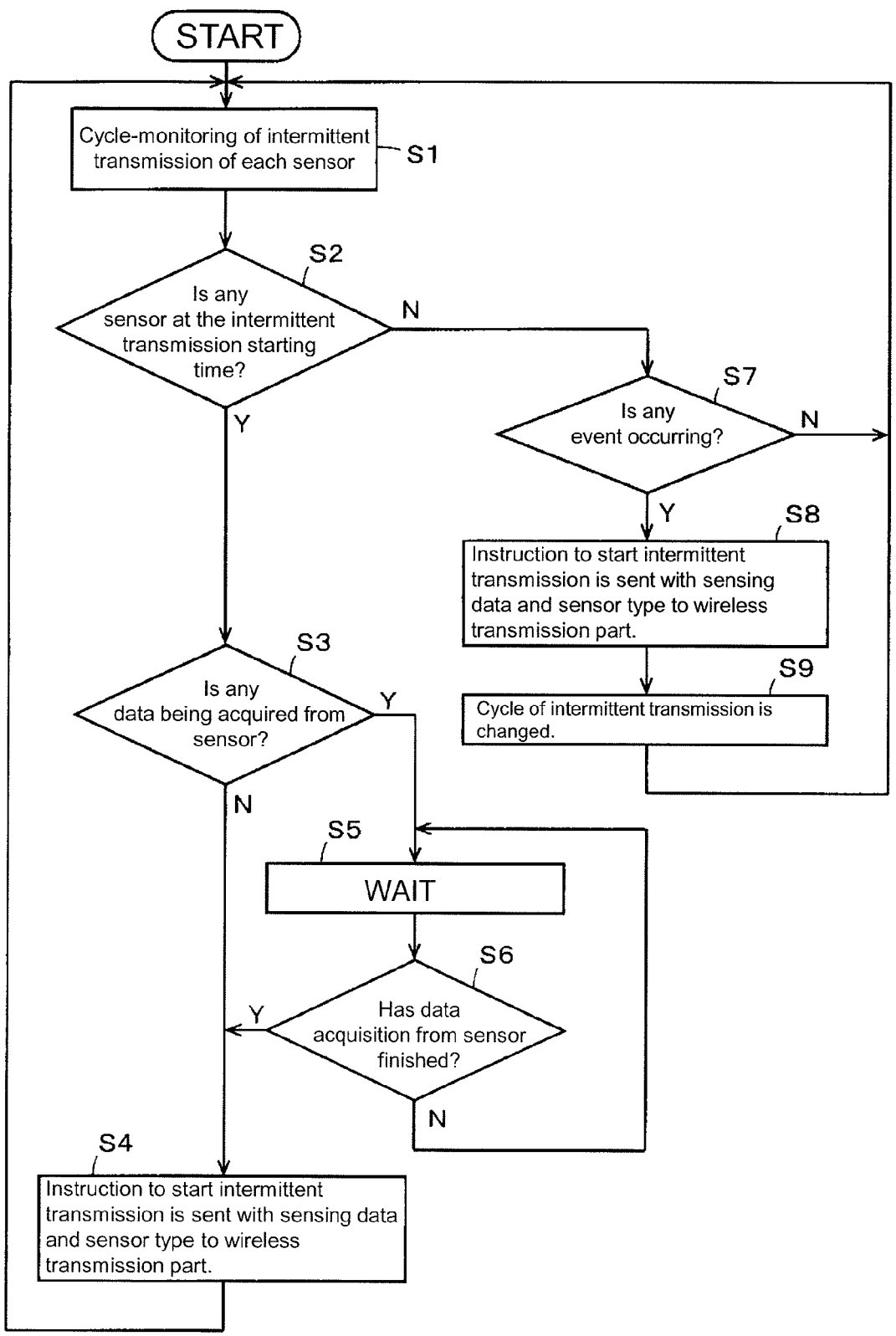
FIG. 6 is a flowchart of a control process example of wireless transmission timing of the sensor terminal shown in FIG. 2.

Processing operation of control to send out an instruction to start intermittent transmission with control part 20 of sensor terminal 2 will be explained with reference to the flowchart shown in FIG. 6.

Control part 20 monitors a cycle of intermittent transmission of each sensor connected to sensor terminal 2 (Step S1). Control part 20 determines if there is a sensor at the instruction timing to start intermittent transmission (Step S2). If there is a sensor at the instruction timing to start intermittent transmission in Step 2, control part 20 determines if sensing data is being acquired from any sensor (Step S3).

If sensing data is not being acquired from any sensor in Step S3, control part 20 transmits the instruction to start intermittent transmission together with type information of sensor for performing the transmission to wireless transmission part (Step S4). Control part 20 progresses the processing from Step S4 back to Step S1, and then repeats the processing after Step S1.

If sensing data is being acquired from any sensor in Step S3, control part 20 waits (Step S5) for finishing the sensing data acquisition from the sensor (Step S6). When finishing of the sensing data acquisition from the sensor is determined in Step S6, control part progresses to Step S4 to transmit the instruction to start intermittent transmission together with sensing data of the sensor for performing the transmission and sensor type information of the sensor to wireless transmission part 24.

If any sensor isn't at the instruction timing to start intermittent transmission in Step 2, control part 20 determines if any event occurrence meeting the event occurrence condition is detected (Step S7). If any event occurrence meeting the event occurrence condition isn't detected in Step S7, control part 20 progresses the processing back to Step S1, and then repeats the processing after Step S1.

If any event occurrence meeting the event occurrence condition is detected in Step 7, control part 20 transmits the instruction to start intermittent transmission together with sensing data of the sensor performing the transmission and sensor type information of the sensor to wireless transmission part 24, so that the transmission is performed about the sensor type registered as related to the occurring event (Step S8). Control part 20 changes intermittent transmission cycle of the sensor performing the transmission into a shorter cycle (Step S9). Then, control part 20 progresses the processing back to Step S1 and then repeats the processing after Step S1.

Figure 7:
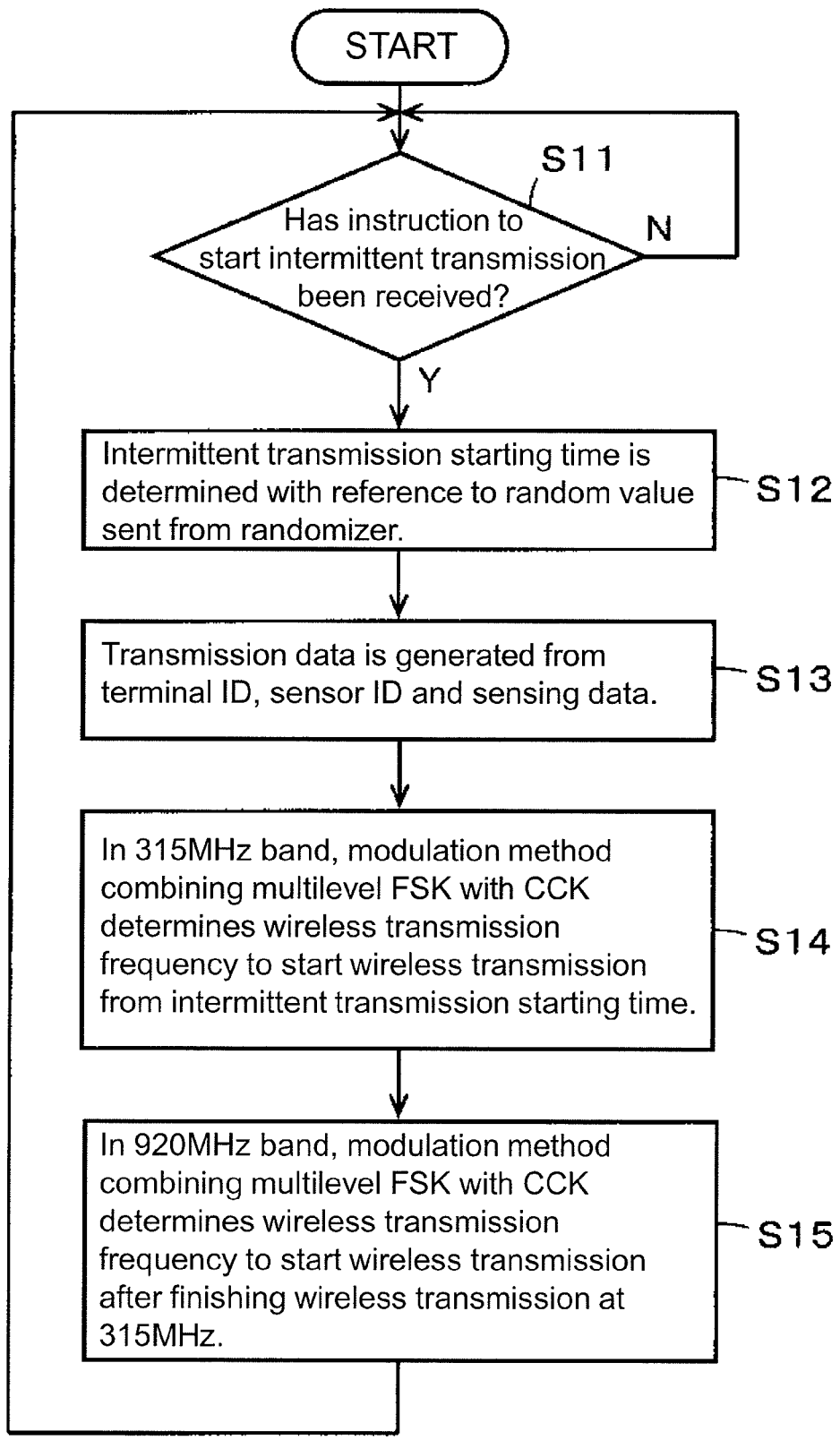
FIG. 7 is a flowchart of another control process example of wireless transmission timing of the sensor terminal shown in FIG. 2.

Processing operation with wireless transmission part 24 will be explained with reference to the flowchart shown in FIG. 7. Besides, when wireless transmission part 24 is constituted by a microprocessor, each step of the flowchart shown in FIG. 7 corresponds to function run as a software processing by the microprocessor.

Intermittent transmission starting time control part 241 of wireless transmission part 24 determines if an instruction to start intermittent transmission has been received from control part 20 (Step S11). Waiting until the instruction has been received, once the instruction is received intermittent transmission starting time is set with reference to a random value from randomizer 242 (Step S12).

Modulation part 243 of wireless transmission part 24 generates transmission data DA shown in FIG. 4 (A) from sensor ID corresponding to a sensor type noticed by control part 20 and sensing data sent from control part 20 (Step S13).

Modulation part 243 performs a modulation processing combining the multilevel FSK and CCK with spread code decision part 2431 and 315 MHz FSK processing part 2432, so that frequency of wireless transmission signal is determined with transmission data DA generated in Step 13 and wireless transmission is performed in 315 MHz band from the intermittent transmission starting time set in Step 12 (Step S14).

Modulation part 243 performs a modulation processing combining the multilevel FSK and CCK with spread code decision part 2431 and 920 MHz FSK processing part 2433, so that frequency of wireless transmission signal is determined with transmission data DA generated in Step 13 and wireless transmission is performed in 920 MHz band after finishing the wireless transmission in 315 MHz of Step 13 (1 msec later since the intermittent transmission starting time) (Step S15).

After finishing wireless transmission in 920 MHz band in Step S15, the processing progresses back to Step S11, and processing after Step S11 is repeated.

In the above-described explanation, sensor terminal 2 performs a wireless transmission with frequency in 315 MHz band during the first 1 msec from the start of the intermittent transmission, followed by another wireless transmission with frequency in 920 MHz band during the next 1 msec. This order may be reversed. The order of wireless transmissions of 315 MHz band and 920 MHz band may be determined according to a random value of randomizer 242. For example, 315 MHz wireless transmission is performed first when the random value is an odd number while 920 MHz wireless transmission is performed first when the random value is an even number.

Back to FIG. 2, sensor terminal 2 is driven by stand-alone power supply 25. Stand-alone power supply 25 may be a battery or a power supply utilizing induced electromotive force of wiring while a solar battery (solar panel) which can generate electricity with indoor illumination light such as fluorescent lamp is employed in this embodiment. Stand-alone power supply 25 supplies electric source voltage to each part such as control part 20 and wireless transmission part 24.

In this embodiment, sensor terminal 2 is provided with voltage detection part 26 detecting electric charge (battery level) of stand-alone power supply 25, and voltage detection part 26 always monitors the electric charge of stand-alone power supply 25 to provide the monitored information of electric charge to control part 20.

In this embodiment, control part 20 refers to the information of electric charge of stand-alone power supply 25 provided from voltage detection part 26, and controls the intermittent transmission cycle of sensing data as being increased when the electric charge of the stand-alone power supply becomes small. Control part 20 wirelessly transmits the information of electric charge as power supply condition information of stand-alone power supply 25 to monitoring center device 5, instead of sensing data at an appropriate timing. The data format of this information is the same as transmission data DA transmitting the sensing data shown in FIG. 4 (A). It should be noted that the sensor ID of transmission data DA in a case of wireless transmission of power supply condition information of stand-alone power supply 25 is configured as a 3-bit code pattern which is not used for sensor type and can be differentiated from sensing data by relay device, as described above.

[Explanation of Relay Device 3]

Figure 8:
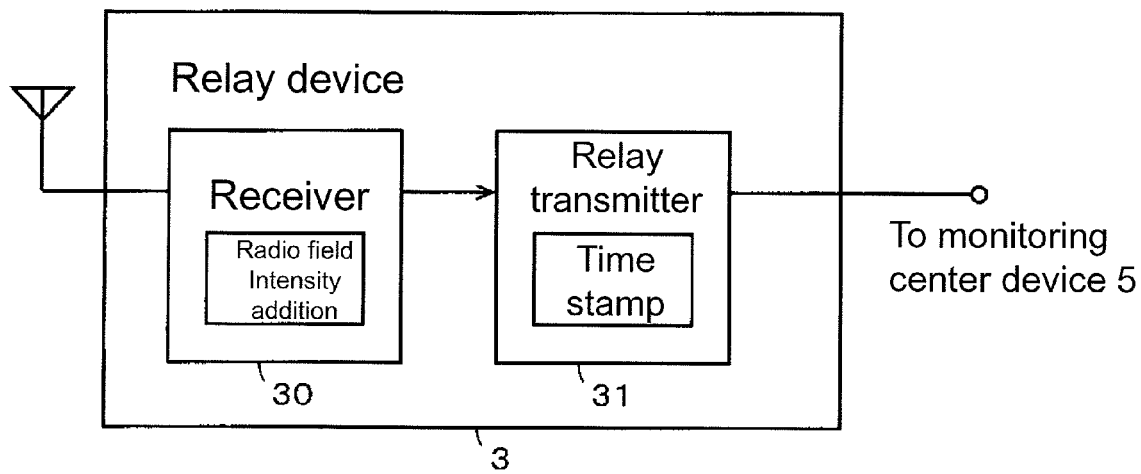
FIG. 8 is a block diagram showing a configuration example of a relay device constituting an embodiment of a sensor network system according to the present invention.

Relay device 3 consists of receiver 30 and relay transmitter 31 as shown in FIG. 8. Receiver 30 receives the wireless transmission signal of sensor terminal 2 to be demodulated once to digital data. Receiver 30 detects radio field intensity of wireless transmission signal received from sensor terminal 2. Receiver 30 converts the detected radio field intensity information into digital data and adds it to the demodulated digital data to be transferred to relay transmitter 31. As described later, monitoring center 5 calculates a position of sensor terminal 2 in monitored area 1 with thus added radio field intensity information.

Relay transmitter 31 adds relay device identification information (relay device ID) and receiving time data to the data transferred from receiver 30, and transmits it to monitoring center device 5 through communication network 4. Monitoring center device 5 uses thus added receiving time information as an acquisition time of sensing data included in transmission data of sensor terminal 2.

Figure 9:
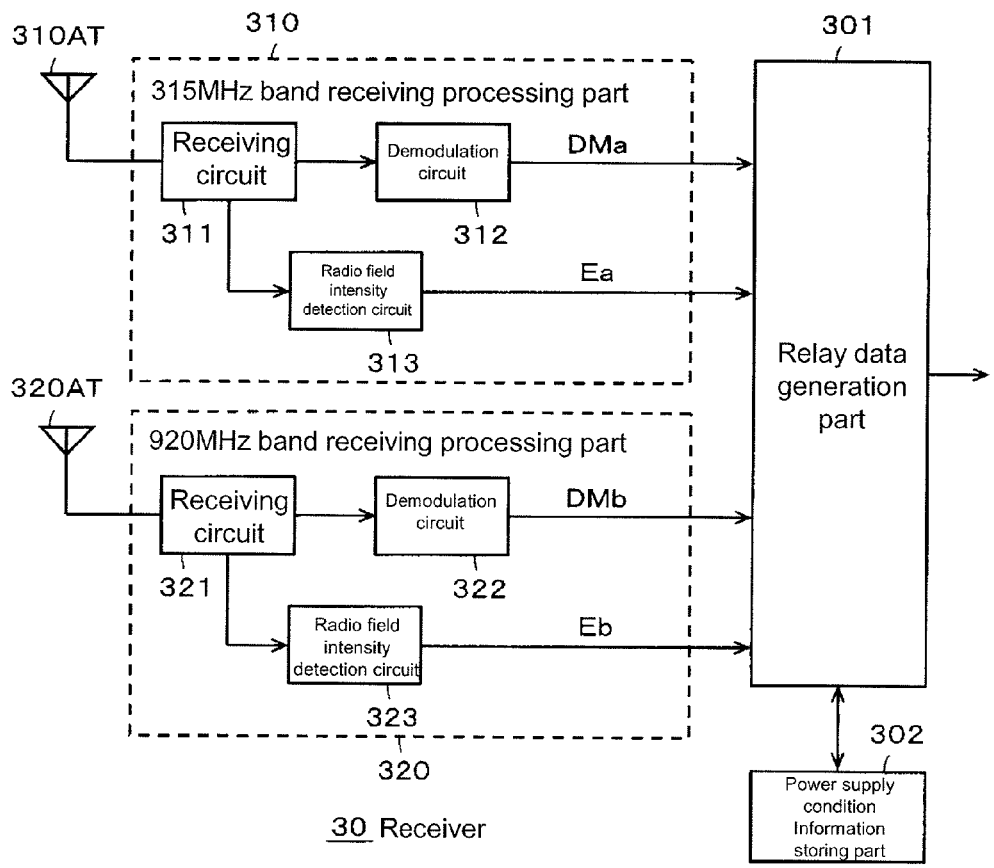
FIG. 9 is a block diagram of a configuration example of a receiver of a relay device shown in FIG. 8.

FIG. 9 shows a block diagram showing a configuration example of receiver 30. As shown in FIG. 9, receiver 30 is provided with 315 MHz band receiving processing part 310, 920 MHz band receiving processing part 320, relay data generation part 301 comprising a baseband circuit and power supply condition information storing part 302.

315 MHz band receiving processing part 310 is provided with receiving circuit 311 to receive 315 MHz band frequency signal received with receiving antenna 310AT, demodulation circuit 312 to demodulate transmission data DA from the frequency signal received with receiving circuit 311 and radio field intensity detection circuit 313 to detect intensity of receiving signal received with receiving circuit 311. Data DMa demodulated with demodulation circuit 312 is provided to relay data generation part 301. Even radio field intensity Ea detected with radio field intensity detection circuit 313 is provided to relay data generation part 301.

920 MHz band receiving processing part 320 is provided with receiving circuit 321 to receive 920 MHz band frequency signal received with receiving antenna 320AT, demodulation circuit 322 to demodulate transmission data DA from the frequency signal received with receiving circuit 321 and radio field intensity detection circuit 323 to detect intensity of receiving signal received with receiving circuit 321. Data DMb demodulated with demodulation circuit 322 is provided to relay data generation part 301. Even radio field intensity Eb detected with radio field intensity detection circuit 323 is provided to relay data generation part 301.

Relay data generation part 301 compares radio field intensity Ea of radio field intensity detection circuit 313 with radio field intensity Eb of radio field intensity detection circuit 323. The one having the greater radio field intensity between demodulated data DMa and demodulated data DMb is selected as a demodulation data to be transmitted to monitoring center device 5. The greater radio field intensity is added to the demodulation data to generate relay data to be transferred to relay transmitter 31.

When the sensor ID of the modulated data DMa or DMb is an identification information of power supply condition information instead of sensing data, relay data generation part 301 doesn't transfer the received power supply condition information to relay transmitter 31 but stores it temporarily as corresponding to the terminal ID of the received data in power supply condition information storing part 302. The power supply condition information stored as corresponding to each terminal ID of power supply condition information storing part 302 is renewed when new power supply condition information is received. Then, when demodulation data DMa or DMb of the same terminal ID is received next time, the relay data including power supply condition information stored in power supply condition information storing part 302 is sent to monitoring center device 5.

Figure 10:
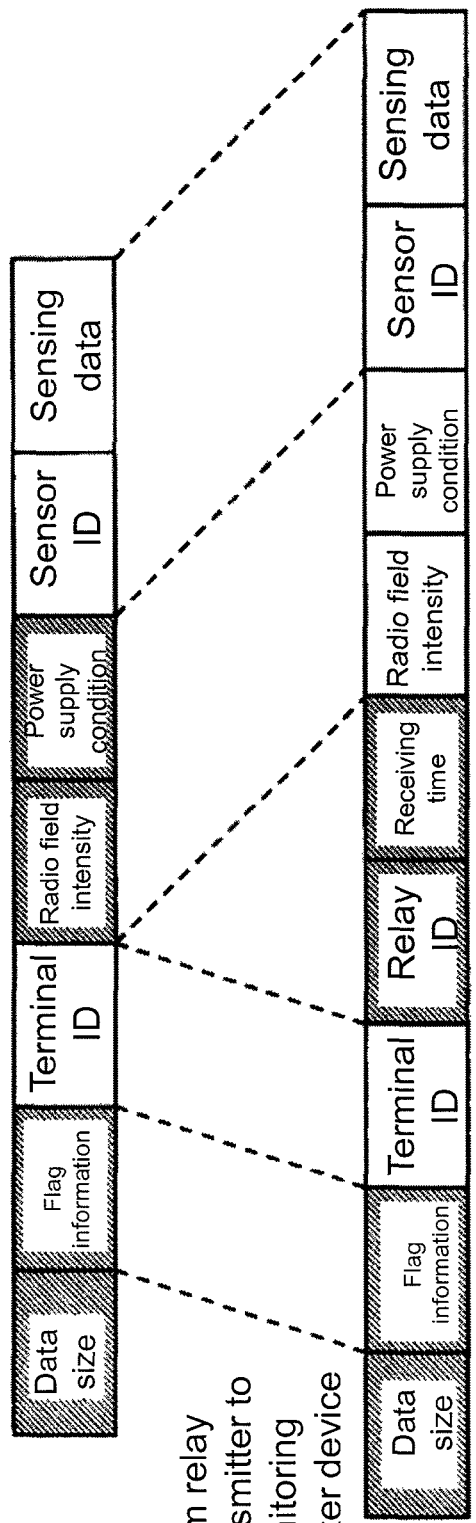
FIG. 10 shows examples of data format of data transferred to a relay transmitter from a receiver of the relay device shown in FIG. 8 and data format of relay data sent from a relay device shown in FIG. 8.

Data format of the data transferred from receiver 30 to relay transmitter 31 is shown in FIG. 10 (A). In FIG. 10 (A), terminal ID, sensor ID and sensing data which are indicated in white backgrounds are data included in data DMa or DMb received and demodulated.

Data size, flag information, radio field intensity and power supply condition which are indicated in shaded backgrounds are data added by relay data generation part 301. The data size is information showing a total data size of relay data. The flag information includes radio field intensity information and a flag showing that the power supply condition information is added.

Next, 315 MHz band receiving processing part 310 and 920 MHz band receiving processing part 320 will be explained in more detail of the configuration and operation. The configuration and operation of 315 MHz band receiving processing part 310 are the same as 920 MHz band receiving processing part 320, except that there are different frequency bands employed, different spread codes and different numbers of frequencies used in the modulation method combining multilevel FSK and CCK or the like. Accordingly, 315 MHz band receiving processing part 310 will be representatively explained as follows.

Figure 11:
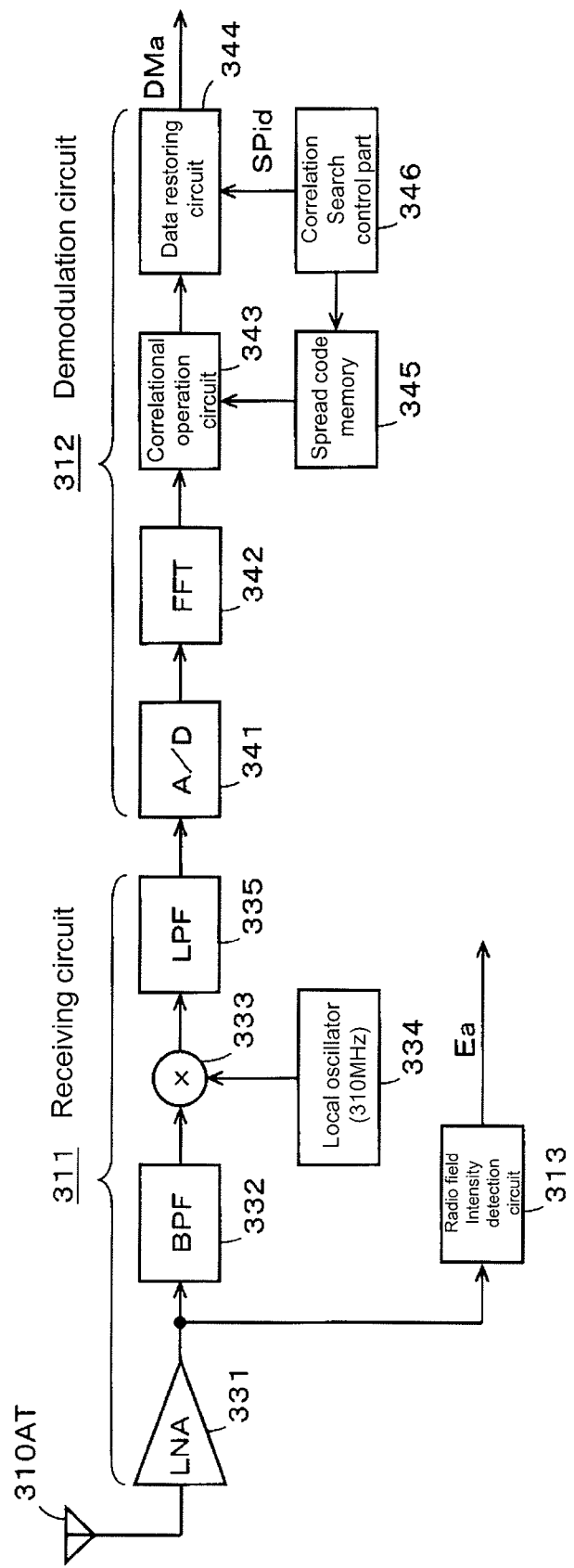
FIG. 11 is a block diagram showing a configuration example of the receiver of the relay device shown in FIG. 9.

FIG. 11 is a block diagram showing a configuration example of 315 MHz band receiving processing part 310. In this example, receiving circuit 311 is provided with low-noise amplifier 331, bandpass filter 332, mixer circuit 333, local oscillator 334 and low-path filter 335.

The signal received by receiving antenna AT is provided to bandpass filter 332 through low-noise amplifier 331, and the signal in 315 MHz band is extracted from the received signal. The signal provided from low-noise amplifier 331 is even provided to radio field intensity detection circuit 313.

The signal in 315 MHz band provided from bandpass filter 332 is provided to mixer circuit 333. In this example, the local oscillatory frequency of local oscillator 334 is set to 310.00 MHz that is the smallest frequency selected from 256 allocation frequencies in 315 MHz band described above. Mixer circuit 333 converts frequency of the signal in 315 MHz band provided from bandpass filter 332 mixed with the signal of the local oscillatory frequency provided from local oscillator 334. Then the output signal of mixer circuit 333 is provided to low-path filter 335 and is subject to a band limitation. An intermediate frequency signal is taken out by low-path filter 335.

The intermediate frequency signal provided from low-path filter 335 is a signal having a frequency of difference between the frequency of 315 MHz band signal provided from bandpass filter 332 and the frequency of the local oscillatory frequency provided from local oscillator 334. Therefore, 256 kinds of signals in 315 MHz band employed by the multilevel FSK are converted to 256 kinds of intermediate frequency signals having frequencies between 0 Hz (direct current) and 12.80 MHz, to be acquired from low-path filter 335. The intermediate frequency signals of low-path filter 335 are provided to demodulation circuit 312.

In this example, demodulation circuit 312 is provided with A/D (Analog-to-Digital) converter 341, FFT (Fast Fourier Transform) circuit 342, correlational operation circuit 343, data restoring circuit 344, spread code memory 345 and correlation search control part 346.

A/D converter 341 samples the intermediate frequency signal provided from low-path filter 335 with a predetermined sampling frequency and converts the sampling value into a digital signal. The digital signal provided from A/D converter 341 is provided to FFT circuit 342, and is converted from time-series data to frequency-series data.

FFT circuit 342 performs an FFT operation using 256 digital signals provided from the A/D converter by time interval $\Delta t$ determined according to sampling frequency in one cycle of the FFT processing. Therefore from FFT circuit 342, intensity level data (time-series spectrum) of each frequency fn (=310 MHz+n×1/$\Delta t$ [Hz] where n=0 to 255) is acquired. The sampling frequency is determined to satisfy 1/$\Delta t$ [Hz]=0.05 MHz.

Therefore from FFT circuit 342, signal intensity levels of 256 kinds of frequencies are acquired between 310.00 MHz and 322.80 MHz by 0.05 MHz intervals in one cycle of each FFT processing. The nth (n=0 to 255) intensity level data of 256 intensity level data output from FFT circuit 342 in every cycle of each FFT processing corresponds to the signal intensity level data of frequency fn while each frequency of the intensity level data is known. The time-series spectrum is provided from FFT circuit 342 to correlational operation circuit 343.

The cycle of FFT processing with FFT circuit 342 is set to a value of spread code speed divided by 2 or more integer. Namely, FFT circuit 342 is configured to perform several times of FFT processing in 1-chip cycle of the spread code. The sampling frequency of A/D converter 341 is set to a frequency capable of synchronizing the FFT processing cycle and acquiring 256 sampling values by several times in 1-chip cycle of the spread code. The processing clock of correlational operation circuit 343 is also set as synchronizing the FFT processing cycle. Correlational operation circuit 343 is configured to always comprehend the correlational operation of received signal intensity level data of any frequencies.

Spread code memory 345 stores the above-described code string patterns [1000], [0001], [0010], [0100] of 4-chip spread code. Correlation search control part 346 sends a control signal to spread code memory 345 and controls the spread code memory to cyclically read out the 4 types of 4-chip code string patterns. The code string patterns of the spread code read out from spread code memory 345 are provided to correlational operation circuit 343.

With correlational operation circuit 343, intensity level data of each frequency fn provided from FFT circuit 342 is subject to a correlational operation with the spread code provided from spread code memory 345, and the correlational coefficient is provided to data restoring circuit 344. From correlation search control part 346, spread code identification information SPid identifying 4-chip spread code that is selected from 4 types of spread codes and is being read out from spread code memory 345 at present. Data restoring circuit 344 restores data transmitted from sensor terminal 2 from the correlational operation result of each fn provided from correlational operation circuit 343 and spread code identification information SPid provided from correlation search control part 346.

The correlational operation and data restoring processing will be explained further, with an example in which received signal is a modulation output signal of transmission data having the code string shown in FIG. 4 (B) is the anterior 18-bit code string.

Correlational operation circuit 343 performs correlational operation such that intensity level data of each frequency fn of FFT circuit 342 is compared with a predetermined threshold level to multiply one parameter by another parameter, wherein "1" is assigned to the one parameter if the intensity level is more than the threshold level while "−1" is assigned thereto if it is less than the threshold level, wherein "−1" is assigned to the other parameter if the chip code value of the spread code provided from spread code memory 345 is "0" while "1" is assigned thereto if the chip code value is "1".

As shown in FIG. 12 (A), the received signal is set as a frequency signal changing like frequency fa-frequency fa-frequency fa-frequency fb, corresponding to 4-chip spread code [0001] in this example. Therefore the time-series spectrum as an output of FFT circuit 342 is such that the intensity level of frequency fa is greater in each interval of frequency fa as shown in FIG. 12 (B) while the intensity level of frequency fb is greater in the interval of frequency fb as shown in FIG. 12 (C).

With correlational operation circuit 343, the intensity level of frequency fa corresponding to the received signal of 4-chip spread code [0001] as shown in FIG. 13 (A) is converted into value [1 1 1 −1] for calculating a correlation coefficient as shown in FIG. 13 (B) while value [−1 −1 −1 1] for calculating a correlation coefficient is assigned to each chip code value of 4-chip spread code [0001] provided from spread code memory 345. Therefore the correlation coefficient of both values is calculated as 1×(−1)+1×(−1)+1×(−1)×1+(−1)=−4. Thus the correlation coefficient is found to be a significant value.

With correlational operation circuit 343, the intensity level of frequency fb corresponding to the received signal of 4-chip spread code [0001] is converted into value [−1 −1 −1 1] for calculating another correlation coefficient as shown in FIG. 13 (C) while 4-chip spread code [0001] is provided from spread code memory 345. Therefore the other correlation coefficient of both values is calculated as (−1)+1×1×(−1)+(−1)×(−1)+(−1)×(−1)=4. Thus the other correlation coefficient is also found to be a significant value.

In this example, when 4-chip spread code has a code string other than [0001], correlation coefficients with the intensity levels of frequency fa and frequency fb are all zero. Correlation coefficients thus calculated with correlational operation circuit 343 are provided to data restoring circuit 344.

Figure 14:
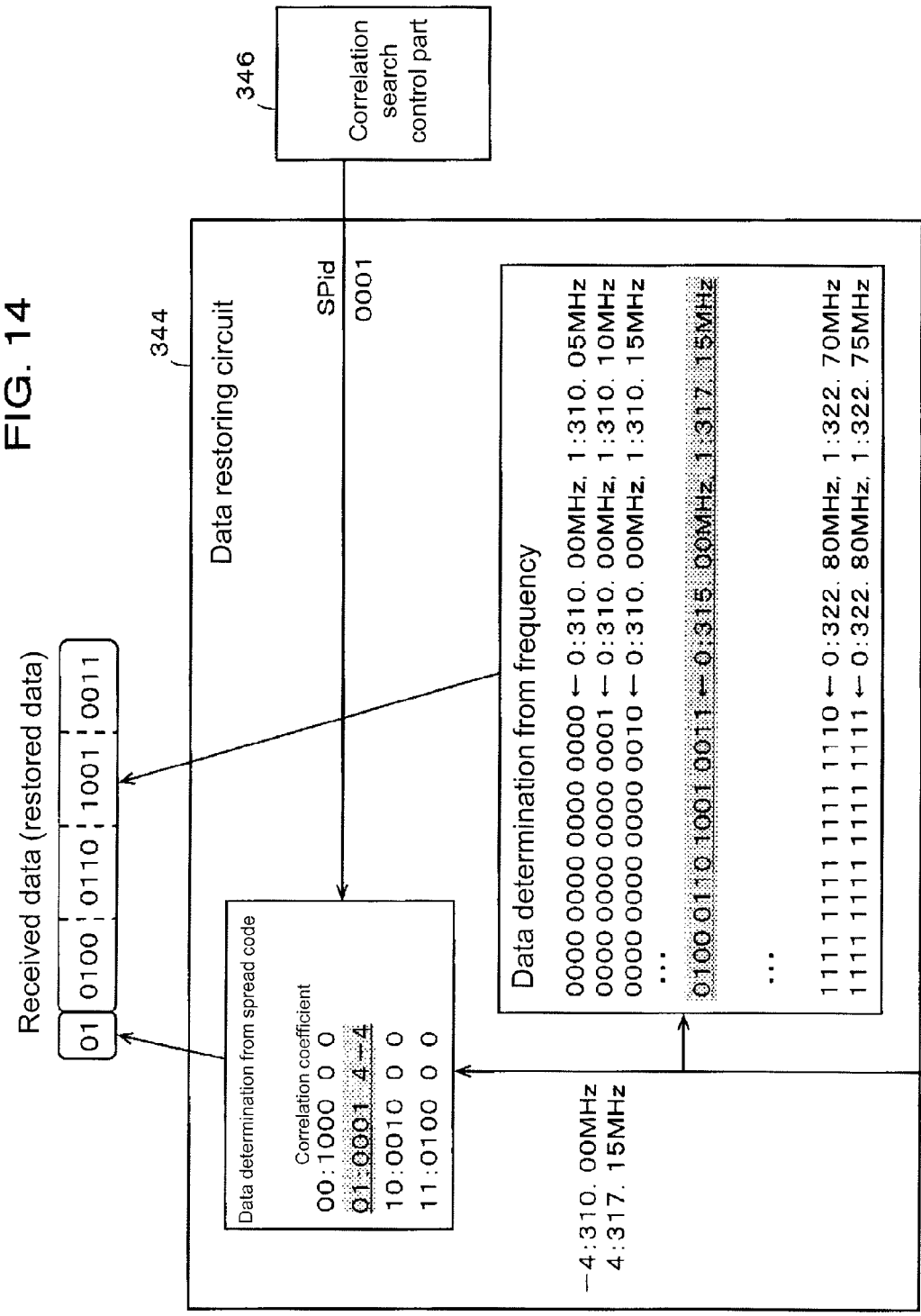
FIG. 14 is another explanatory diagram of processing operation by a demodulation circuit of the receiver of the relay device shown in FIG. 9.

As shown in FIG. 14, data restoring circuit 344 is provided with a correspondence table between each spread code identification information SPid of 4-types of 4-chip code string pattern of the spread code and 2-bit data in the restored data. As shown in FIG. 14 (C), data storing circuit 344 stores a correspondence table between each 16-bit data code string pattern following the top 2 bits of the restored data and a pair of frequency allocated to chip code value "0" of spread code and frequency allocated to chip code "1" of spread code.

From spread code identification information SPid of correlation search control part 346 in a case that the correlation coefficient of correlational operation circuit 343 is a significant value, data restoring circuit 344 identifies the 4-chip code string pattern of spread code selected from 4 types of code string patterns in a case that the correlation coefficient is a significant value, so that 2-bit data corresponding to the identified code string pattern is assigned to the top 2 bits of 18-bit restored data with reference to the correspondence table.

From the correlation coefficient value provided from correlational operation circuit 343 and the two frequencies showing the significance, data restoring circuit 344 decides 16-bit data code string pattern following the top 2 bits of restored data with reference to the correspondence table. From correlation coefficient "−4" corresponding to frequency fa and correlation coefficient "4" corresponding to frequency fb, correlational operation circuit 343 identifies a frequency corresponding to code value "0" of 4-chip spread code as fa=315.00 MHz and another frequency corresponding to code value "1" as fb=317.15 MHz, and restores 16-bit code string [0100011010010011] corresponding to the frequencies.

As described above, the cycle of FFT processing with demodulation circuit 312 is set to a value of spread code chip cycle divided by an integer while plural sets of FFT processing are performed per 1 chip. Therefore, receiver 30 of relay device 3 can demodulate and restore the data transmitted from sensor terminal 2 at least once in the plural sets of the FFT processing. As described above, the data transmitted from sensor terminal 2 can be received to be restored with relay device 3 even when the transmission from sensor terminal 2 is not synchronized with receiving with relay device 3.

Thus 315 MHz band receiving processing part 310 restores 18-bit data and the following 18-bit data similarly with demodulation circuit 312, so that 36-bit transmission data DA is restored. Similarly, demodulation circuit 322 of 920 MHz band receiving processing part 320 restores transmission data DA.

As described above, relay data generation part 301 selects data having the greater radio field intensity between data restored with 315 MHz band receiving processing part 310 and data restored with 920 MHz band receiving processing part 320. Then information of radio field intensity and power supply condition is added to the selected data to be transferred to relay transmitter 31 as shown in FIG. 10 (A).

To transmission signal provided from receiver 30, relay transmitter 31 adds relay device ID of identification information of relay device 3 and receiving time information of transmission signal at relay device 3 provided from sensor terminal 2, as shown in FIG. 10 (B). Relay transmitter 31 also changes data size information and flag information. Information flags of relay device ID and receiving time are added to the radio field intensity information flag and power supply condition information that have already been provided.

In the above-described embodiment, relay device 3 is configured to send either the restored data of received information in 315 MHz band or the restored data of received data in 920 MHz band to monitoring center device 5, although it may be configured to send both of them together with each radio field intensity information to monitoring center device 5. It is possible that the restored data of received information in 315 MHz band and the restored data of received data in 920 MHz band are sent to monitoring center device 5 only if they are matched and otherwise they are not sent to monitoring center device 5.

[Explanation of Monitoring Center Device 5]

Figure 15:
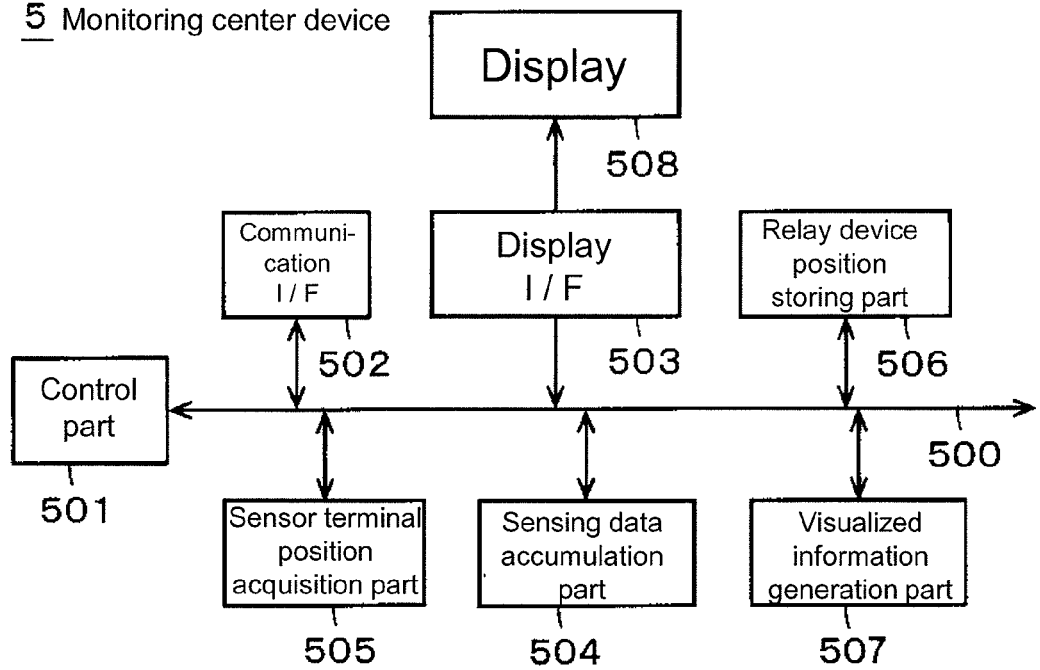
FIG. 15 is a block diagram showing a configuration example of a monitoring center device constituting an embodiment of a sensor network system according to the present invention.

FIG. 15 is a block diagram showing a hardware configuration example of monitoring center device 5. Monitoring center device 5 can be configured with a personal computer. As shown in FIG. 15, monitoring center device 5 is configured with control part 501 comprising CPU (Central Processing Unit) connected through system bus 500 to communication interface 502, display interface 503, sensing data accumulation part 504, sensor terminal position acquisition part 505, relay device position storing part 506 and visualized information generation part 507.

Control part 501 controls monitoring center device 5 as a whole. Communication interface 502 exchanges information signals through communication network 4. Display 508 such as LCD (Liquid Crystal Display) is connected to display interface 503. Display interface 503 provides display data to the display.

Sensing data accumulation part 504 accumulates the sensing data of sensor included in data received from relay device 3 through communication network 4 in a memory not shown, as corresponding to terminal ID of sensor terminal, sensor type ID and receiving time information.

Sensor terminal position acquisition part 505 estimates a sensor terminal position having a terminal ID in monitored area 1, from radio field intensity information corresponding to the terminal ID of sensor terminal included in the data received from relay device 3 through communication network 4 and the positional information of relay devices 3 stored in relay device position storing part 506, and stores it in a memory not shown.

Relay device position storing part 506 stores positional information of relay device 3 provided in monitored area 1 registered in advance. The positional information of relay device 3 includes information of height as well as latitude and longitude.

For example, the positional information of relay device 3 may be acquired with a position measuring device such as GPS position measuring device by a constructor of relay device 3 and sent to monitoring center device 5 to store it in relay device position storing part 506. Alternatively, it is possible that relay device 3 is provided with a position measuring device such as GPS position measuring device to acquire positional information and sends it from relay device 3 through communication network 4 to monitoring center device 5 to store it in relay device position storing part 506.

Visualized information generation part 507 generates a visualized information of environmental components in monitored area 1 for each sensor type according to data accumulated in sensing data accumulation part 504. Thus generated visualized information is displayed visibly on display screen of display 508 through display interface 503.

For the hardware configuration example of monitoring center device 5 shown in FIG. 15, sensing data accumulation part 504, sensor terminal position acquisition part 505 and visualized information generation part 507 can be configured as software processing functions corresponding to programs executed by control part 501.

Figure 16:
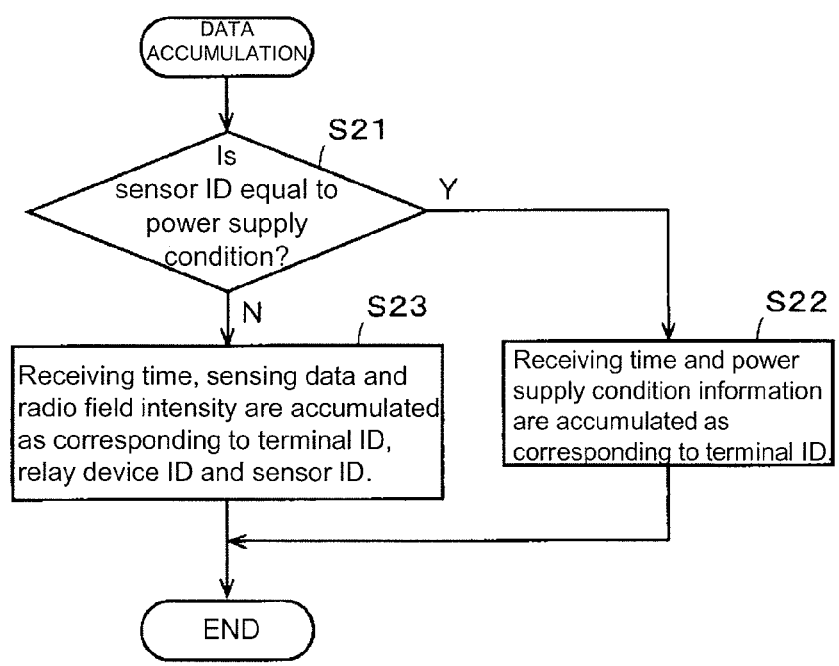
FIG. 16 is a flowchart of an example of processing operation of the monitoring center device shown in FIG. 15.

The processing of monitoring center device 5 will be explained in detail as follows. FIG. 16 is a flowchart to explain an example of the processing flow of sensing data accumulation part 504. In this explanation of FIG. 16, it will be assumed that control part 501 configures processing function of sensing data accumulation part 504 as software processing function.

Control part 501 determines whether the sensor ID of data received from relay device 3 is an ID indicating the power supply condition (Step S21). If the sensor ID is determined as an ID indicating the power supply condition in Step S21, control part 501 accumulates the power supply condition information in a memory as corresponding to the receiving time information and terminal ID extracted from the received data (Step S22). Then this processing routine is finished.

If the sensor ID is determined not to be an ID indicating the power supply condition in Step 21, control part 501 accumulates the sensing data and radio field intensity information as corresponding to the relay ID, sensor ID, receiving time information and terminal ID extracted from data received from relay device 3 (Step S23). Then this processing routine is finished.

The power supply condition information that has been accumulated as corresponding to the terminal ID and receiving time is used for monitoring the electric charge amount of stand-alone power supply of sensor terminal in monitoring center device 5.

The radio field intensity that has been accumulated as corresponding to the terminal ID, relay ID, sensor ID and receiving time information is used for estimating the position of sensor terminal in sensor terminal position acquisition part 505.

Figure 17:
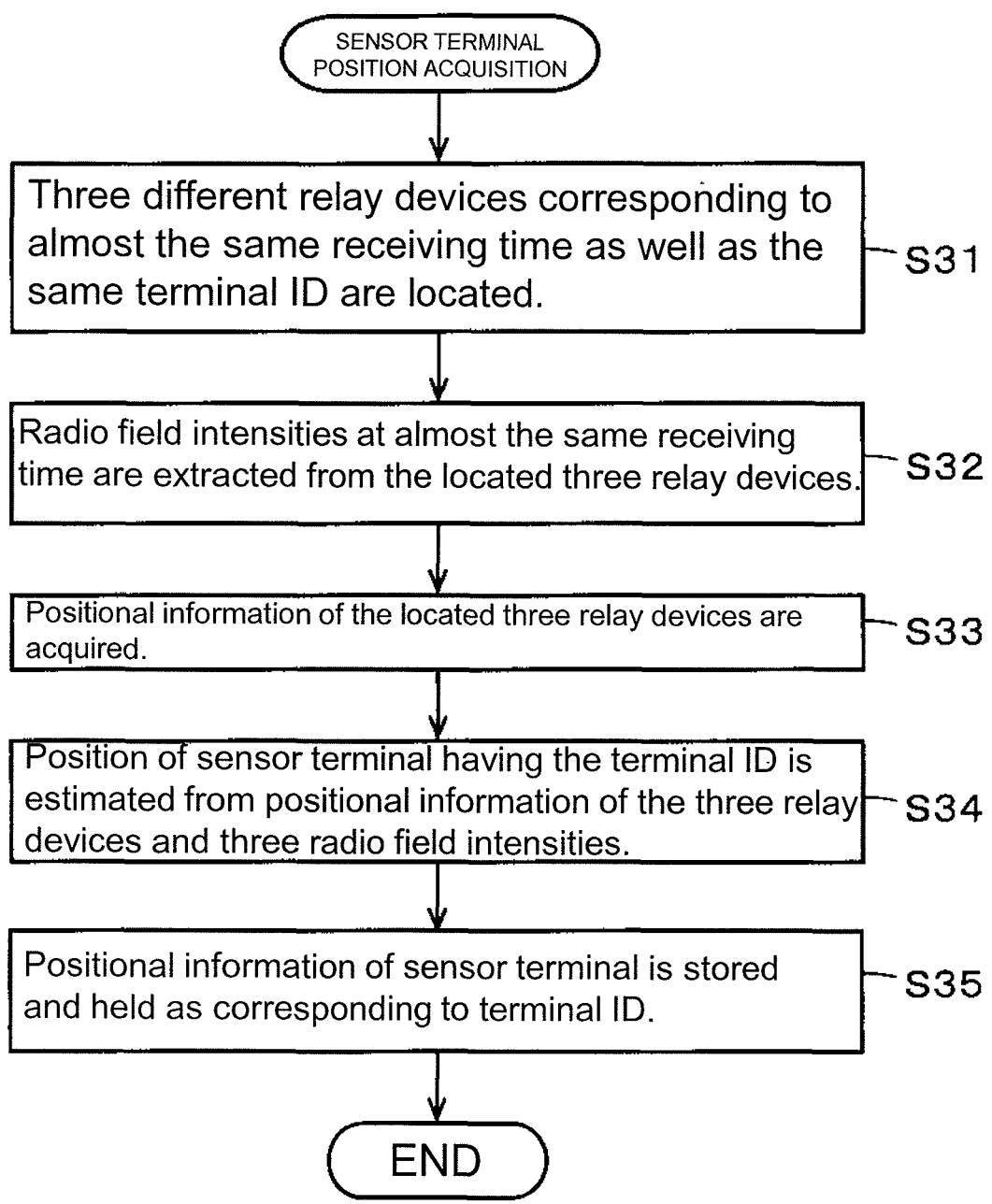
FIG. 17 is another flowchart of an example of processing operation of the monitoring center device shown in FIG. 15.

FIG. 17 is a flowchart showing an example of estimation processing of the sensor terminal position in sensor terminal position acquisition part 505. In this explanation of FIG. 17, it will be assumed that control part 501 configures a processing function of sensor terminal position acquisition part 505 as a software processing function.

Control part 501 starts the processing routine shown in FIG. 17, at a predetermined cycle or certain timings of reacquisition of the sensor terminal position. The certain timings of the reacquisition of the sensor terminal position may be defined as times when a notice of position change of sensor terminal 2 in monitored area 1 is received from the administrator.

From data stored in a memory of sensing data accumulation part 504, control part 501 locates three relay devices 3 having different relay IDs stored as corresponding to almost the same latest receiving time and the same terminal ID (Step S31). Next, control part 501 extracts radio field intensities of thus located three relay devices 3 of the receiving time (Step S32).

Next, control part 501 acquires three positional information of the three relay devices located in Step 31 from relay device position storing part 506 with each relay ID (Step S33). Then, control part 501 estimates a position in monitored area 1 of sensor terminal 2 having the terminal ID used to locate relay devices 3 in Step S31 from thus acquired positional information of the three relay devices and information of three radio field intensities (Step S34). The radio field intensity depends on the distance between sensor terminal 2 and relay device 3. So, the position of sensor terminal 2 is estimated by a so-called trilateration method with known positional information of three relay devices and radio field intensity corresponding to the distance.

Control part 501 stores and keeps thus estimated positional information of sensor terminal in a memory as corresponding to the terminal ID (Step S35). Even sensor ID sent together is stored in the memory as corresponding to the same terminal ID. Thus a plurality of sensors which have different sensor IDs linked to the same terminal ID are supposed to have the same positional information (to be present at the same position). On the other hand, the memory stores different positional information (to be present at different positions) for each sensor having the same sensor ID. This processing routine is finished here.

Even when the position of sensor terminal 2 is changed in monitored area 1, monitoring center device 5 can automatically estimate the changed position to keep the position of sensor terminal 2 comprehended any time by the processing routine shown in FIG. 17.

Visualized information generation part 507 generates a visualized information by using data accumulated in the memory of sensing data accumulation part 504 and positional information stored in the memory of sensor terminal position acquisition part 505.

Figure 18:
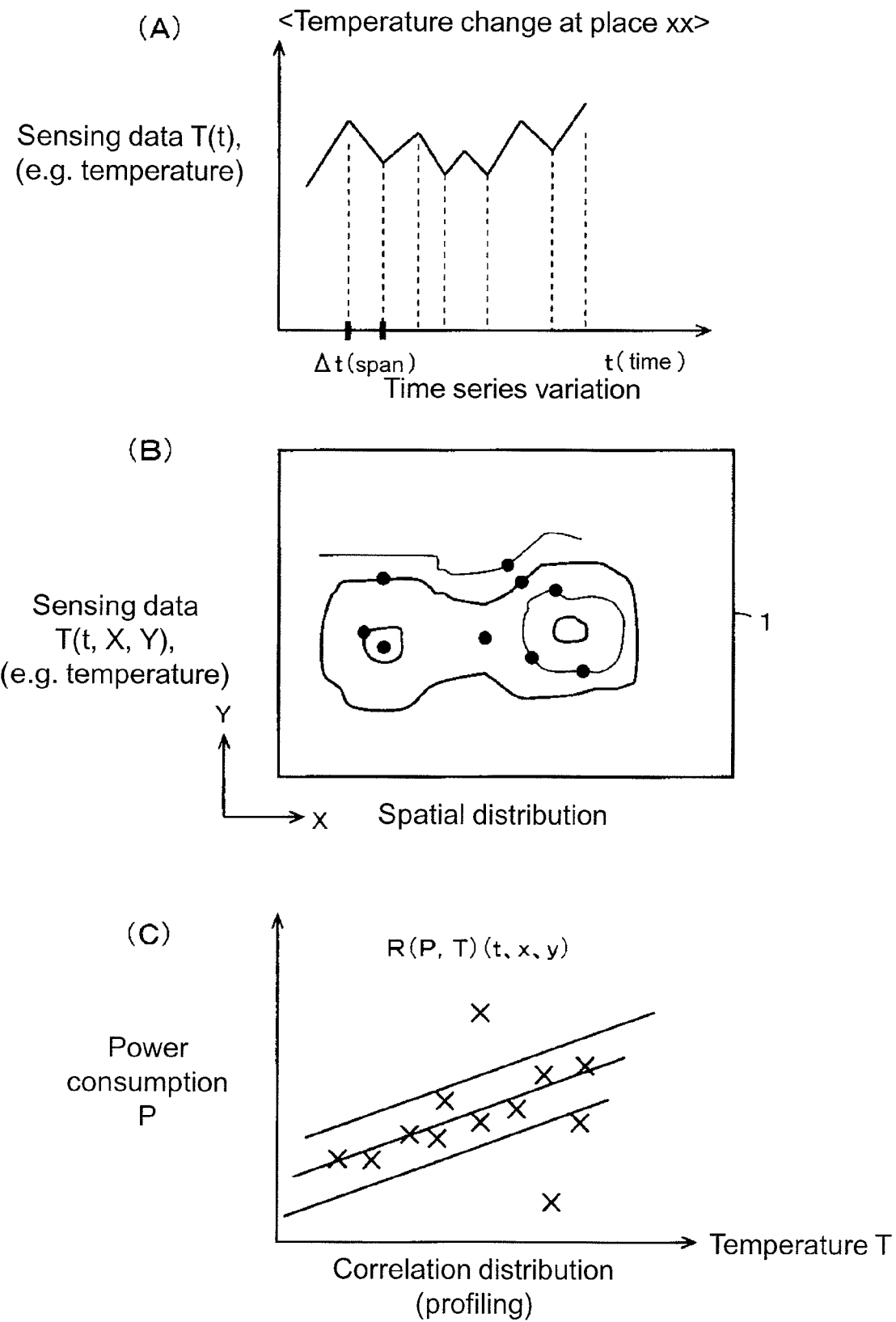
FIG. 18 is an explanatory diagram of an example of visualization result by the monitoring center device shown in FIG. 15.

FIG. 18 shows an example of visualized information generated by visualized information generation part 507. For the first example of visualized information, the visualized information of time-series variation of sensing data of a predetermined sensor type at a predetermined position may be displayed on a display. FIG. 18 (A) shows an example of time-series variation of temperature sensed with infrared array sensor 61 at a position predetermined by a user in monitored area 1. In FIG. 18 (A), "place xx" indicates the predetermined position.

In the first example, visualized information generation part 507 reads out extracted sensing data stored in the order of receiving time corresponding to the position of sensor of sensor type corresponding to the environmental element for visualization predetermined by an user from data stored in the memory of sensing data accumulation part 504. From thus read out data, the time-series of display information shown in FIG. 18 (A) is generated and displayed on the screen of display 508.

For the second example of visualized information, the spatial distribution of environmental elements in monitored area 1 (environment condition in monitored area 1) detected by sensors of predetermined type may be visibly displayed with sensing data of visualized information of many of the sensors provided in monitored area 1. FIG. 18 (B) shows a display example of visualized temperature at a predetermined time and each position in monitored area 1 with sensing data of infrared array sensors 61 provided as dispersed to several positions in monitored area 1. In FIG. 18 (B), the black circles show sensor terminal positions (positions of sensor terminal connected to the sensor) and the lines connecting black circles are lines (isothermal lines) drawn as connecting positions of the same temperature. Thus the temperature environment depending on positions in monitored area 1 can be visibly displayed in detail.

In this example, visualized information generation part 507 reads out extracted sensing data of all sensors of sensor type corresponding to the environmental element for visualization predetermined by an user from data stored in the memory of sensing data accumulation part 504 while the positions of sensor terminals connected to sensors are read out from the memory of sensor terminal position acquisition part 505. Then visualized information generation part 507 allocates temperature information as sensing data corresponding to each sensor position in monitored area 1 as a coordinate space and connects positions having the same temperature to draw lines to generate the visualized information shown in FIG. 18 (B).

Even the time-series variation of the spatial distribution can be visualized by displaying the spatial distribution at various timings.

For the third example of visualized information, the correlation of environmental elements monitored in monitored area 1 may be visibly displayed. FIG. 18 (C) shows a display example of visualized correlation distribution between power consumption P calculated from sensing data of electric current/magnetic field sensor 65 and temperature T as sensing data of infrared array sensor 61.

In this example, visualized information generation part 507 extracts sensing data of all electric current/magnetic field sensors 65 accumulated in sensing data accumulation part 504 and sensing data of all infrared array sensors 61 as corresponding to receiving time to obtain the correlation result, from which display information shown in FIG. 18 (C) is generated to be displayed on the screen of display 508.

Figure 19:
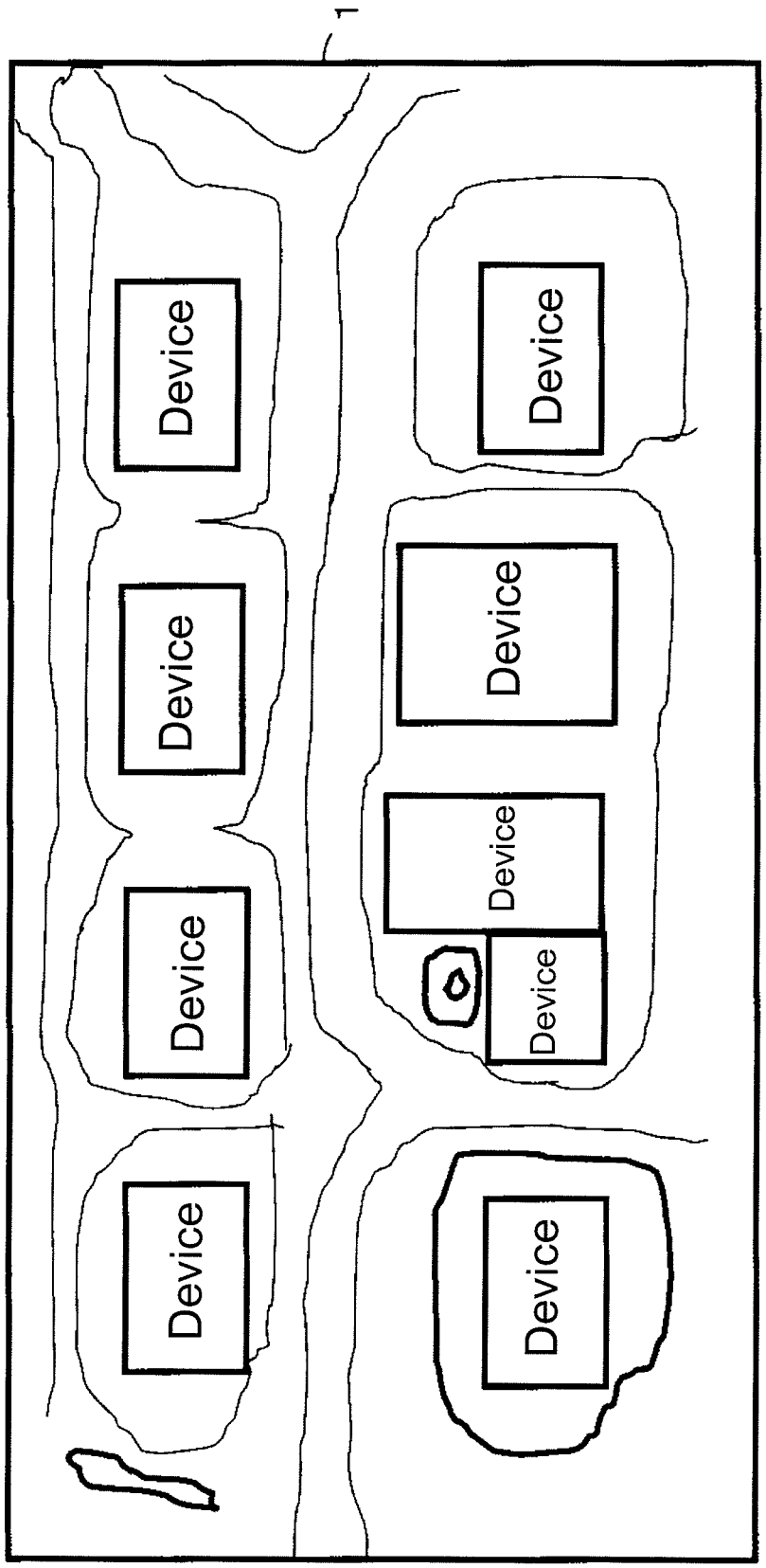
FIG. 19 is another explanatory diagram of an example of visualization result by the monitoring center device shown in FIG. 15.
Figure 20:
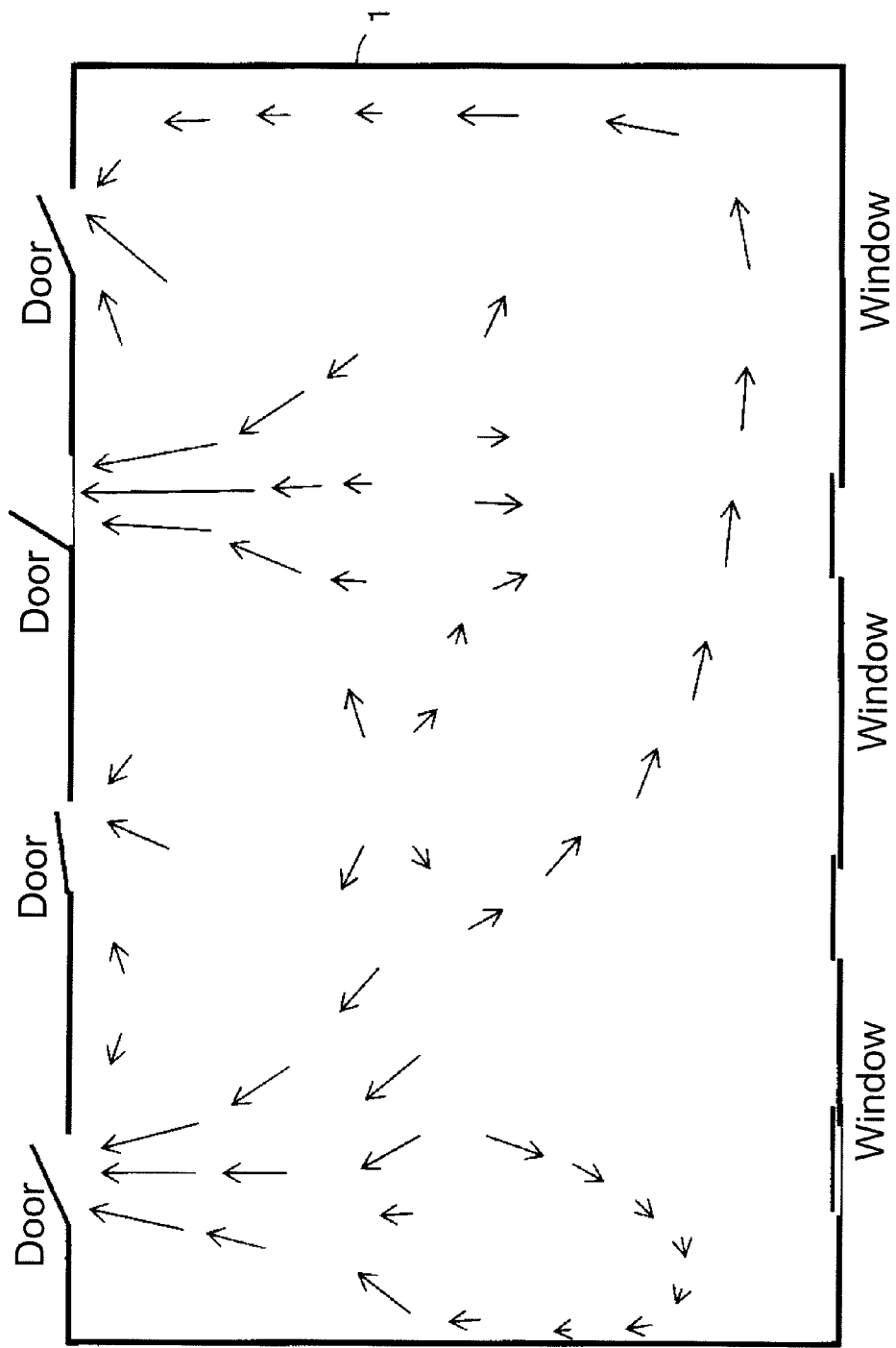
FIG. 20 is yet another explanatory diagram of an example of visualization result by the monitoring center device shown in FIG. 15.

FIG. 19 and FIG. 20 show other display examples of spatial distribution according to the second example of visualized information. FIG. 19 shows a spatial distribution of dust concentration with sensing data of dust sensor 62 at a predetermined time in a case that a plurality of devices are provided in a factory as monitored area 1. In FIG. 19, the curves are lines connecting positions having the same dust concentration while the thinner lines have the lower dust concentration and the thicker lines have the higher dust concentration.

Even the time-series variation of spatial distribution of the dust concentration can be visualized by displaying the spatial distribution of the dust concentration at various timings. The display example of the dust concentration distribution shown in FIG. 19 may be monitored to easily comprehend the dust concentration varying temporarily and spatially according to size, height or the like of the facility.

FIG. 20 shows a display example of airflow strength in an office space as monitored area 1. In FIG. 20, visualized information generation part 507 displays positions of windows and doors as corresponding to the airflow in monitored area 1. Thus the relation between the airflow strength and environment can be comprehended better.

Other Embodiments

Figure 21:
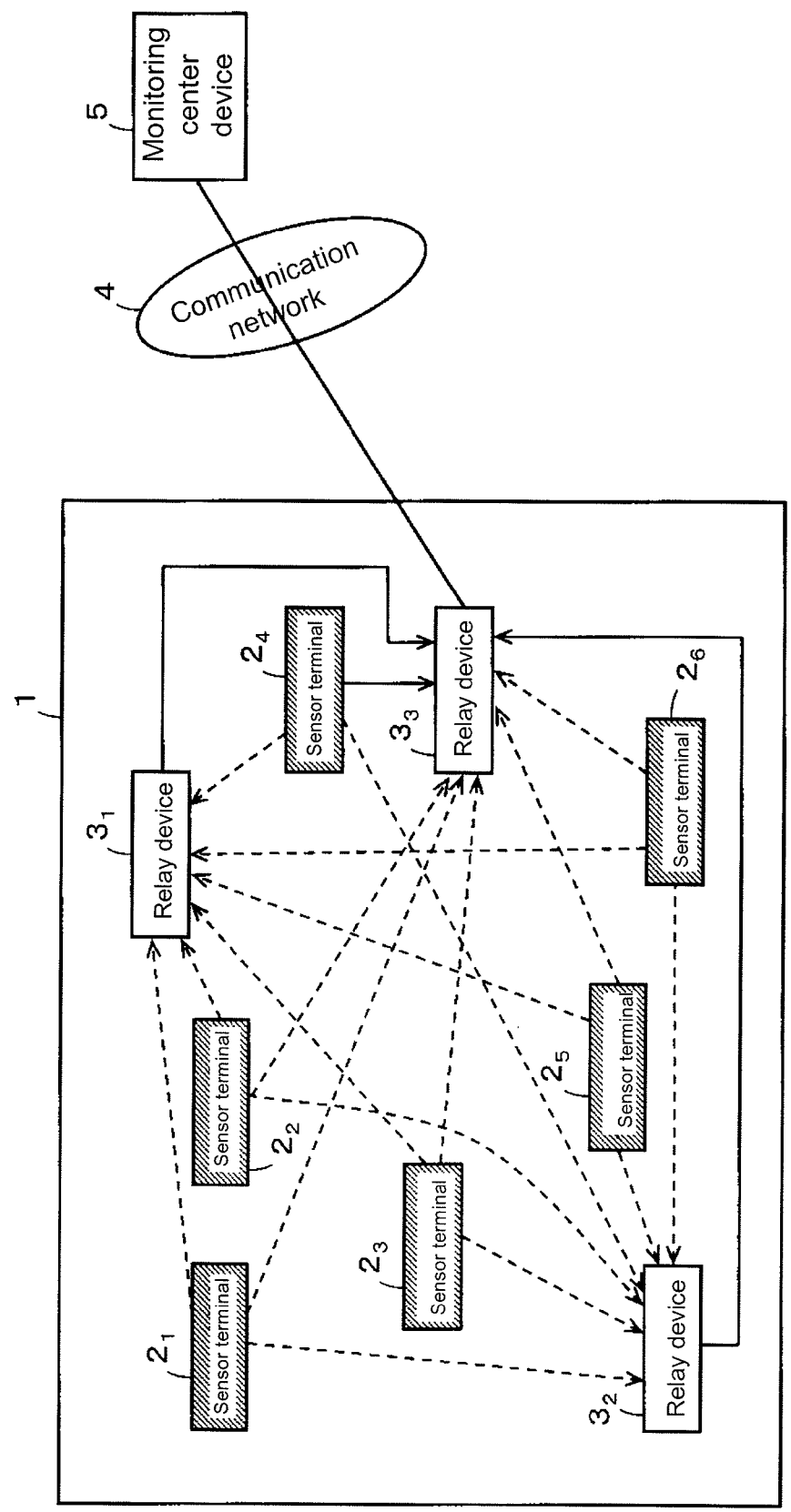
FIG. 21 is an explanatory diagram of another abstract embodiment of a sensor network system according to the present invention.

In the above-described embodiments, relay devices $3_1$-$3_m$, are connected to monitoring center device 5 through communication network 4 and generate relay data to be transferred to monitoring center device 5. As shown in FIG. 21, it is possible that only one of plurality of relay devices is connected to monitoring center device 5 through communication network 4.

As shown in FIG. 21, only relay device 33 is connected to monitoring center device 5 through communication network 4. Relay devices 31, 32 other than relay device 33 are connected to relay device 33. The connection between relay device 33 and relay device 31 or 32 may be a wired connection or a wireless connection like sensor terminal 2.

In this example, relay device 33 transfers data formatted as shown in FIG. 10 (B) to monitoring center device 5 through communication network 4 while relay devices 31 and 32 transfer data formatted as shown in FIG. 10 (A) to relay device 33. The data transferred from relay devices 31 and 32 to relay device 33 includes relay IDs of relay devices 31 and 32.

In the example shown in FIG. 21, it is possible that the relay device to transfer information received from another relay device to monitoring center device 5 notifies monitoring center device 5 of positional information of sensor terminal 2 located in monitored area 1.

[Effect of Embodiments]

The above-described embodiments of sensor network system can display the visualized sensing data including time-series variation of many sensors provided in a monitored area having environment condition varying depending on positions, so that detailed environment condition is monitored in the monitored area.

In the embodiments, the relay device sends receiving time information of received signal together with the received signal sent from the sensor terminals to the monitoring center device, so that the monitoring center device regards the time information added by the relay device as acquisition time of sensing data included in the transmission signal sent from the sensor terminals. Therefore, time information does not need to be added to the transmission signal sent from the sensor terminal.

In the embodiments, the relay device detects radio field intensity of the receiving time of the signal sent from the sensor terminal and sends the radio field intensity information together with the received signal sent from the sensor terminal to the monitoring center, which estimates a position of the sensor terminal in the monitored area from the radio field intensity information. Therefore, positional information of the sensor terminal does not need to be added to the transmission signal sent from the sensor terminal.

In the embodiments, the transmission signal sent from the sensor terminal does not include the sensing data acquisition time information and sensor terminal positional information and therefore is configured as a very short sentence consisting of minimum necessary identification information and sensing data. Therefore, even when many sensor terminals in the monitored area wirelessly transmit the transmission data at a predetermined intermittent cycle, the wireless transmission of transmission data from sensor terminal can easily be dispersed in the intermittent cycle so that the transmission data is wirelessly transmitted without conflict to each other.

In the embodiments, the starting time of the intermittent transmission from the sensor terminal is delayed from the timing defined by a predetermined cycle according to random values, so that a plurality of sensor terminals are prevented from having conflict of transmission starting time as far as possible.

Further, the sensor terminal modulates the transmission data by a combined modulation method of multilevel FSK and CCK for wireless transmission. Therefore the transmission signal from the sensor terminal has a frequency corresponding to data content of the transmission data, so that it is unlikely that frequencies of transmission signal become equal even under conflict of transmission starting time. Therefore the transmission signals having the same transmission starting time can be separately modulated at the receiving side so that the failure possibility of receiving transmission signals can be decreased.

Furthermore, the transmission signals from the sensor terminal are sent with the same data content in different frequency bands such as 315 MHz and 920 MHz which can be separated easily, therefore the same data is received by several times to make sure the receiving at the receiving side.

Other Embodiments or Modified Examples

In the above-described embodiments, sensor terminal position acquisition part 505 of monitoring center device 5 acquires an estimated position of each sensor terminal 2 from the radio field intensity of the receiving time of the signal sent from sensor terminal 2. It is possible that sensor terminal position acquisition part 505 of monitoring center device 5 acquires the position of sensor terminal 2 by other ways. Such ways will be described as follows.

<Other Example 1 of Sensor Terminal Position Acquisition Part 505>

For other example 1 of sensor terminal position acquisition part 505, relay device 3 adds only the receiving time information but the radio field intensity information to the transmission signal sent from sensor terminal 2 and transfers it to monitoring center device 5. Monitoring center device 5 acquires an estimated position of each sensor terminal from the information, which has been added by the relay device, of receiving time of transmission signal sent from the sensor terminal. Like the radio field intensity of received signal transmitted from sensor terminal 2, the distance between relay device 3 and sensor terminal 2 corresponds to the time difference between receiving times of sensing data included in signals of the same sensing data content transferred from at least three relay devices 3 having the same sensor identification information. Therefore, monitoring center device 5 can acquire an estimated position of sensor identified by the same identification information, according to the time difference between receiving times of sensing data included in transferred signals having the same sensing data content.

<Other Example 2 of Sensor Terminal Position Acquisition Part 505>

Any relay device is not provided in other example 2 of sensor terminal position acquisition part 505. For example, a construction crew to provide sensor terminals in the monitored area measures positions of the sensor terminals with a GPS position measurement means or the like and stores the measured positional information as corresponding to terminal IDs of the sensor terminals, and then transfers the stored positional information to a memory device provided in monitoring center device 5 for registration. The correspondence information between the measured positional information and the terminal IDs of the sensor terminals may be sent to the monitoring center device through mobile telephone network to register the positions in the memory device. Sensor terminal position acquisition part 505 in monitoring center device 5 acquires the positional information of each sensor terminal stored in the memory device according to the terminal ID included in the received signal.

In this example, a relay device is not necessary and the monitoring center device employs the receiving time of signal transmitted from the sensor terminal as acquisition time information of sensing data.

Then at the intermittent transmission timing, the sensor terminal transmits time-shared signals of the same transmission signal content in transmission interval of the first frequency band (315 MHz band) and transmission interval of the second frequency band (920 MHz band). The signals of the same transmission signal content may be transmitted in a plurality of frequency bands by other ways.

For example, each of the sensor terminal may allocate the same transmission signal for each intermittent transmission to the first frequency band (315 MHz band) and the second frequency band (920 MHz band) to be wirelessly transmitted simultaneously in the same transmission interval. Because the first frequency band (315 MHz band) is significantly distant from the second frequency band (920 MHz band) in frequency, the receiving side can easily separate the frequency for the receiving processing.

In order to transmit time-shared signal of the same transmission signal content in transmission interval of the first frequency band (315 MHz band) and transmission interval of the second frequency band (920 MHz band), it is possible that each of the first frequency band (315 MHz band) and the second frequency band (920 MHz band) is further divided while each of the transmission interval of the first frequency band (315 MHz band) and the transmission interval of the second frequency band (920 MHz band) is further divided according to the number of divided frequency bands, in which the time-shared signal is transmitted.

The frequency bands to be employed for the wireless transmission from the sensor terminal may be other than the above-described bands such as 315 MHz band and 920 MHz band.

Instead of two frequency bands of 315 MHz and 920 MHz for the wireless transmission from the sensor terminal in the embodiments, three or more frequency bands may be employed to include the same transmission signal from sensor terminals for transmitting it repeatedly.

Although the sensor terminal doesn't have any receiving function to receive a receipt confirmation signal from relay devices in the embodiments, the sensor terminal can be provided with receiving function, and configured to resend sensing data in case it fails to receive the receipt confirming signal from relay devices. Although the communication between the sensor terminal and relay device isn't synchronous in the embodiments, synchronized communication can be performed by sending the sensing data to the relay device after the sensor terminal sends a timing signal required for synchronization.

EXPLANATION OF SYMBOLS

1: monitored area
2 ($2_1$-$2_n$): sensor terminal
3 ($3_1$-$3_m$): relay device
4: communication network
5: monitoring center device
24: wireless transmission part
242: randomizer
243: modulation part
244: ID allocation part
30: receiver
301: relay data generation part
31: relay transmitter
311, 321: receiving circuit
312, 322: demodulation circuit
313, 323: radio field intensity detection circuit
504: sensing data accumulation part
505: sensor terminal position acquisition part
506: relay device position storing part
507: visualized information generation part

The invention claimed is:

1. A sensor network system comprising:
a plurality of sensor terminals which are driven with a stand-alone power supply and provided in a predetermined area in which one or more sensors are connected to each of the sensor terminals provided at a predetermined position in the predetermined area to wirelessly transmit sensing data of one or more environmental elements sensed with the one or more sensors; and
a monitoring center device collecting the sensing data wirelessly transmitted from the sensor terminals,
each of the sensor terminals having a wireless transmitter that wirelessly and intermittently transmits its terminal identification information, sensor identification information identifying each type of the one or more sensors and latest sensing data sensed by each of the one or more sensors,
the monitoring center device comprising:
a processor that acquires positional information of the sensor terminals in the predetermined area;
a memory that accumulates time-series data of the sensing data transmitted from the sensor terminals as corresponding to acquisition times of the sensing data; and
a display that displays a visualized time-series variation of the sensing data of the one or more environmental elements detected by the one or more sensors in the predetermined area by using the positional information of the sensor terminals and the time-series data of the sensing data,
wherein the monitoring center device regards a receiving time of a transmission signal including the sensing data as the acquisition time of the sensing data to accumulate the sensing data, and the transmission signal does not include the acquisition time of the sensing data.

2. The sensor network system according to claim 1, wherein the transmission signal does not include any synchronization information and the transmission signal is constantly monitored to detect the receiving time of the transmission signal at a receiving side.

3. The sensor network system according to claim 1, wherein at least three relay devices are provided in the predetermined area, each of the relay devices comprises:
a radio field intensity detector that detects a radio field intensity of a receiving time of the transmission signal; and
a relay transmitter that transfers information of the radio field intensity together with the terminal identification information, the sensor identification information and the sensing data to the monitoring center device,
wherein the processor acquires an estimated position of the sensor terminal identified by the terminal identification information from the information of the radio field intensity included in signals, which include the same terminal identification information, the same sensor identification information and the same sensing data among transferred signals transferred from said at least three relay devices.

4. The sensor network system according to claim 3, wherein each of the relay devices has a receiving time detector that detects the receiving time of the transmission signal,
the relay transmitter transfers information of the receiving time together with the terminal identification information, the sensor identification information, the sensing data and the information of the radio field intensity to the monitoring center device, and
the monitoring center device regards the receiving time as the acquisition time of the sensing data to accumulate the sensing data.

5. The sensor network system according to claim 1, wherein at least three relay devices are provided in the predetermined area, each of the relay devices comprising:
a receiving time detector that detects a receiving time of the transmission signal; and
a relay transmitter that transfers information of the receiving time together with the terminal identification information, the sensor identification information and the sensing data to the monitoring center device,
the monitoring center device regards the receiving time as the acquisition time of the sensing data to accumulate the sensing data, and the monitoring center device acquiring an estimated position of the sensor terminal identified by the terminal identification information according to a time difference between the receiving times included in signals which include the same terminal identification information, the same sensor identification information and the same sensing data among the transferred signals transferred from said at least three relay devices.

6. The sensor network system according to claim 1, wherein each of the sensor terminals has a random value generating processor, which generates a random value employed to decide a starting time of the intermittent wireless transmission.

7. The sensor network system according to claim 1, wherein each of the sensor terminals detects a predetermined event according to the sensing data, and wirelessly transmits the transmission signal when the predetermined event occurs, regardless of a timing of the intermittent wireless transmission.

8. The sensor network system according to claim 1, wherein each of the sensor terminals detects a predetermined event according to the sensing data, changes a cycle of the intermittent wireless transmission and wirelessly transmits the transmission signal when the predetermined event occurs.

9. The sensor network system according to claim 1, wherein each of the sensor terminals wirelessly transmits the same transmission signal in a first frequency band and a second frequency band per each wireless transmission.

10. The sensor network system according to claim 9, wherein the sensor terminal wirelessly transmits the same transmission signal in the first frequency band of a time interval and the second frequency band of another time interval.

11. The sensor network system according to claim 9, wherein the sensor terminal wirelessly transmits the same transmission signal simultaneously in the first frequency band and the second frequency band.

12. The sensor network system according to claim 1, wherein each of the sensor terminals has a modulator that modulates transmission data by a modulation method to allocate different wireless transmission frequencies to different transmission data.

13. The sensor network system according to claim 12, wherein the modulator decides a spread code according to the transmission data and decides a wireless transmission frequency allocated to a chip code value of the spread code.

* * * * *

UNITED STATES PATENT AND TRADEMARK OFFICE
CERTIFICATE OF CORRECTION

PATENT NO. : 9,516,699 B2  Page 1 of 1
APPLICATION NO. : 14/436994
DATED : December 6, 2016
INVENTOR(S) : H. Okada et al.

It is certified that error appears in the above-identified patent and that said Letters Patent is hereby corrected as shown below:

In the Claims

Column 29, Lines 4-5 (Claim 5, Lines 16-17) please change "signals which" to -- signals, which --

Signed and Sealed this
Second Day of May, 2017

Michelle K. Lee
*Director of the United States Patent and Trademark Office*